United States Patent
Ueta et al.

(10) Patent No.: US 8,217,539 B2
(45) Date of Patent: Jul. 10, 2012

(54) ELECTRIC MOTOR HAVING AN ENCAPSULATED STATOR FOR A VEHICLE BRAKING DEVICE

(75) Inventors: Tetsuji Ueta, Hirakata (JP); Hiroaki Sagara, Kasai (JP); Takeshi Nagao, Hirakata (JP); Takashi Uchino, Hirakata (JP); Kenji Taguchi, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 65 days.

(21) Appl. No.: 12/566,880

(22) Filed: Sep. 25, 2009

(65) Prior Publication Data

US 2010/0295387 A1  Nov. 25, 2010

(30) Foreign Application Priority Data

Sep. 26, 2008 (JP) ................................. 2008-249301
Jul. 30, 2009 (JP) ................................. 2009-178373

(51) Int. Cl.
  *H02K 1/04* (2006.01)
  *H02K 15/12* (2006.01)
  *B29C 45/14* (2006.01)

(52) U.S. Cl. ......... 310/43; 310/89; 310/88; 264/272.19; 264/272.2; 264/273; 264/274; 264/275

(58) Field of Classification Search ............. 310/43, 310/88, 89; 264/271.1–272.21; *H02K 15/12, H02K 1/04; B29C 45/14*
See application file for complete search history.

(56) References Cited

U.S. PATENT DOCUMENTS

| | | | |
|---|---|---|---|
| 3,873,861 A * | 3/1975 | Halm | 310/43 |
| 3,979,822 A | 9/1976 | Halm | |
| 4,129,796 A * | 12/1978 | Papst | 310/43 |
| 4,841,190 A * | 6/1989 | Matsushita et al. | 310/257 |
| 5,845,390 A * | 12/1998 | Cheng et al. | 29/596 |
| 5,986,365 A | 11/1999 | Kuwert et al. | |
| 6,359,354 B1 * | 3/2002 | Watanabe et al. | 310/87 |
| 7,679,258 B2 * | 3/2010 | Hsiao et al. | 310/257 |
| 8,026,641 B2 * | 9/2011 | Lee | 310/49.18 |
| 2001/0045782 A1 | 11/2001 | Lieu et al. | |
| 2003/0160523 A1 * | 8/2003 | Suzuki et al. | 310/43 |
| 2004/0080223 A1 * | 4/2004 | Shimizu | 310/75 C |
| 2005/0073213 A1 * | 4/2005 | Naito et al. | 310/218 |
| 2005/0082921 A1 | 4/2005 | Schurter et al. | |
| 2006/0070228 A1 | 4/2006 | Stewart et al. | |
| 2006/0119197 A1 * | 6/2006 | Puterbaugh et al. | 310/87 |

FOREIGN PATENT DOCUMENTS

| | | |
|---|---|---|
| DE | 1488023 P | 5/1969 |
| FR | 2262433 A1 | 9/1975 |
| JP | 61-098140 A | 5/1986 |
| JP | 02-142954 U | 12/1990 |
| JP | 50-038118 A | 2/1993 |
| JP | 10-108434 A | 4/1998 |
| JP | 2003-061278 A | 2/2003 |
| JP | 2007-060834 A | 3/2007 |

* cited by examiner

*Primary Examiner* — Quyen Leung
*Assistant Examiner* — Terrance Kenerly
(74) *Attorney, Agent, or Firm* — Marvin A. Motsenbocker; Mots Law, PLLC

(57) ABSTRACT

An electric motor comprising an annular stator core, a resin molding the stator core, a casing member housing the stator core, wherein the casing member has an opening, and the resin is filled into the opening.

7 Claims, 21 Drawing Sheets

ELECTRIC MOTOR HAVING AN ENCAPSULATED STATOR FOR A VEHICLE BRAKING DEVICE

BACKGROUND OF THE INVENTION

1. Field of the Invention

The present invention relates to an electric motor which includes a casing member housing a stator core and to an electric vehicle.

2. Description of the Related Art

Electric motors have been known each of which includes a casing member housing a stator core, a coil and a rotor. In an electric motor, the polarity of a coil is repeatedly reversed, so that a rotor provided inside a stator core is rotated about an axle. Note that electric motors are used, for example, as power sources for electric vehicles.

Here, to improve heat dissipation performance for heat transferred from a coil provided to a stator core, a technique (hereinafter referred to as a first technique) has been proposed in which a resin is filled into a casing member, while a stator core is mounted in the casing member (for example, see Japanese Patent Application Publication No. 2007-60834).

Moreover, to improve the bonding strength between a stator core and a casing member, a technique (hereinafter referred to as a second technique) has been proposed in which, grooves are provided to a side surface which constitutes the outer periphery of a stator core, and a resin is filled into an opening (groove) formed between the stator core and the casing member (for example, see Japanese Patent Application Publication No. 2003-61278).

Here, stress is generated in the rotation direction of the rotor at interfaces of the casing member with contents (such as the stator core and the resin) housed in the casing member.

With the first technique described above, however, the force to prevent the contents housed in the casing member from rotating relies on the bonding strength between the resin and the casing member. In addition, with the second technique, the stator core is prevented from rotating by the resin filled into the grooves provided in the stator core, and the force to prevent the resin from rotating relies on the bonding strength between the resin and the casing member. As described above, in each of the first and second techniques, since the force to prevent the contents housed in the casing member from rotating relies on the bonding strength between the resin and the casing member, the contents housed in the casing member may rotate in same cases.

Moreover, with the first technique, the contents are covered with the casing member, although such a fact is not particularly mentioned in the second technique. For this reason, the heat dissipation performance of the stator core is inefficient.

In this connection, the present invention has been made to solve the problems described above, and an object of the present invention is to provide an electric motor capable of preventing contents housed in a casing member from rotating and an electric vehicle.

Another object of the present invention is to provide an electric motor and an electric vehicle capable of improving the heat dissipation performance of a stator core.

SUMMARY OF THE INVENTION

A first aspect of the present invention is summarized in that an electric motor comprises an annular stator core, a resin molding the stator core and a casing member housing the stator core. The casing member has an opening. The resin is filled into the opening.

In the aspect mentioned above, the casing member has a protrusion protruding from a contact portion in contact with a bottom surface portion of the stator core. An outer peripheral portion of a stator core has a groove which engages with the protrusion.

In the aspect mentioned above, the casing member has a guide portion which extends along an outer peripheral portion of the stator core. For example, in a case where the resin molding an outer peripheral portion of the stator core is exposed from the casing member, it is preferable that the guiding portion be provided.

In the aspect mentioned above, the stator core has an annular stator yoke, and stator teeth which protrude inwardly in a radial direction from an inner peripheral portion of the stator yoke. Parts of tip portions of the stator teeth and the resin form a cavity for housing a rotor. The cavity has a cylindrical shape having a circular cross-section, a center of the circular cross-section is identical with the rotation center of the rotor.

A second aspect of the present invention is summarized in that an electric motor comprises a stator core, a resin molding the stator core, and a casing member housing the stator core. The casing member has an opening. The resin is exposed from the casing member at the opening.

A third aspect of the present invention is summarized in that an electric motor comprises a stator core, a resin molding the stator core, a casing member housing the stator core, a brake mechanism and a holding member, holding both the casing member and the brake mechanism, interposed between the casing member and the brake mechanism. The brake mechanism brakes rotation of the rotor directly or indirectly.

A fourth aspect of the present invention is summarized in that an electric vehicle comprising the electric motor mentioned above.

According to the present invention, it is possible to provide an electric motor capable of preventing contents housed in a casing member from rotating and an electric vehicle.

Moreover, according to the present invention, it is possible to provide an electric motor capable of improving the heat dissipation performance of a stator core and an electric vehicle.

DETAILED DESCRIPTION OF THE PREFERRED EMBODIMENTS

Figure 1:
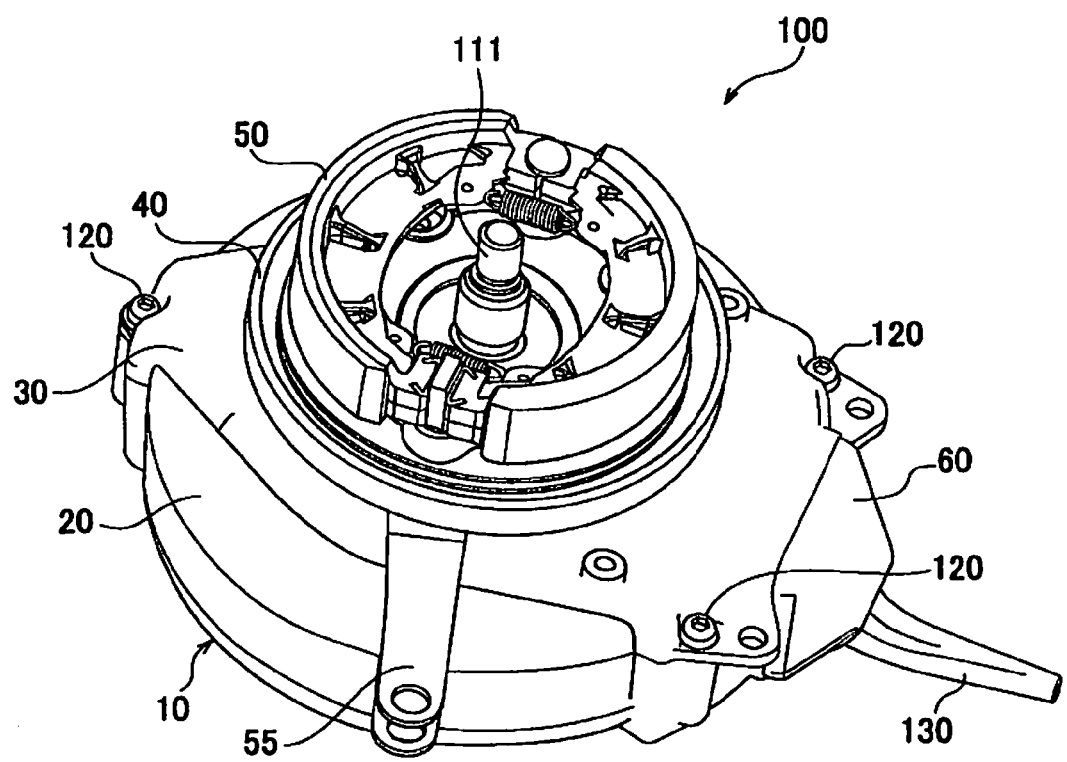
FIG. 1 is a perspective view showing an electric motor 100 according to a first embodiment.

Hereinafter, electric motors according to embodiments of the present invention will be described with reference to the drawings. Note that, in the following description of the drawings, the same or similar parts will be denoted by the same or similar reference numerals.

However, it should be noted that the drawings are schematic and ratios of respective dimensions and the like are different from actual ones. Therefore, specific dimensions and the like should be determined by taking into consideration the following description. Moreover, as a matter of course, also among the drawings, there are included portions in which dimensional relationships and ratios are different from each other.

[Outline of Embodiments]

A motor according to each embodiment includes an annular stator core, a resin molding the stator core, and a casing member for housing the stator core. The casing member has an opening. The resin is filled into the opening.

According to the embodiments, the resin filled into the opening results in generation of a force to prevent the resin from rotating. Accordingly, contents housed in the casing member can be prevented from rotating.

In the electric motor according to the embodiments, the resin is exposed from the casing member at the opening.

With this, the heat generated at the stator core is radiated to the outside through the opening. Accordingly, it is possible to improve the heat dissipation performance of the stator core.

[First Embodiment]

(Configuration of Electric Motor)

Figure 2:
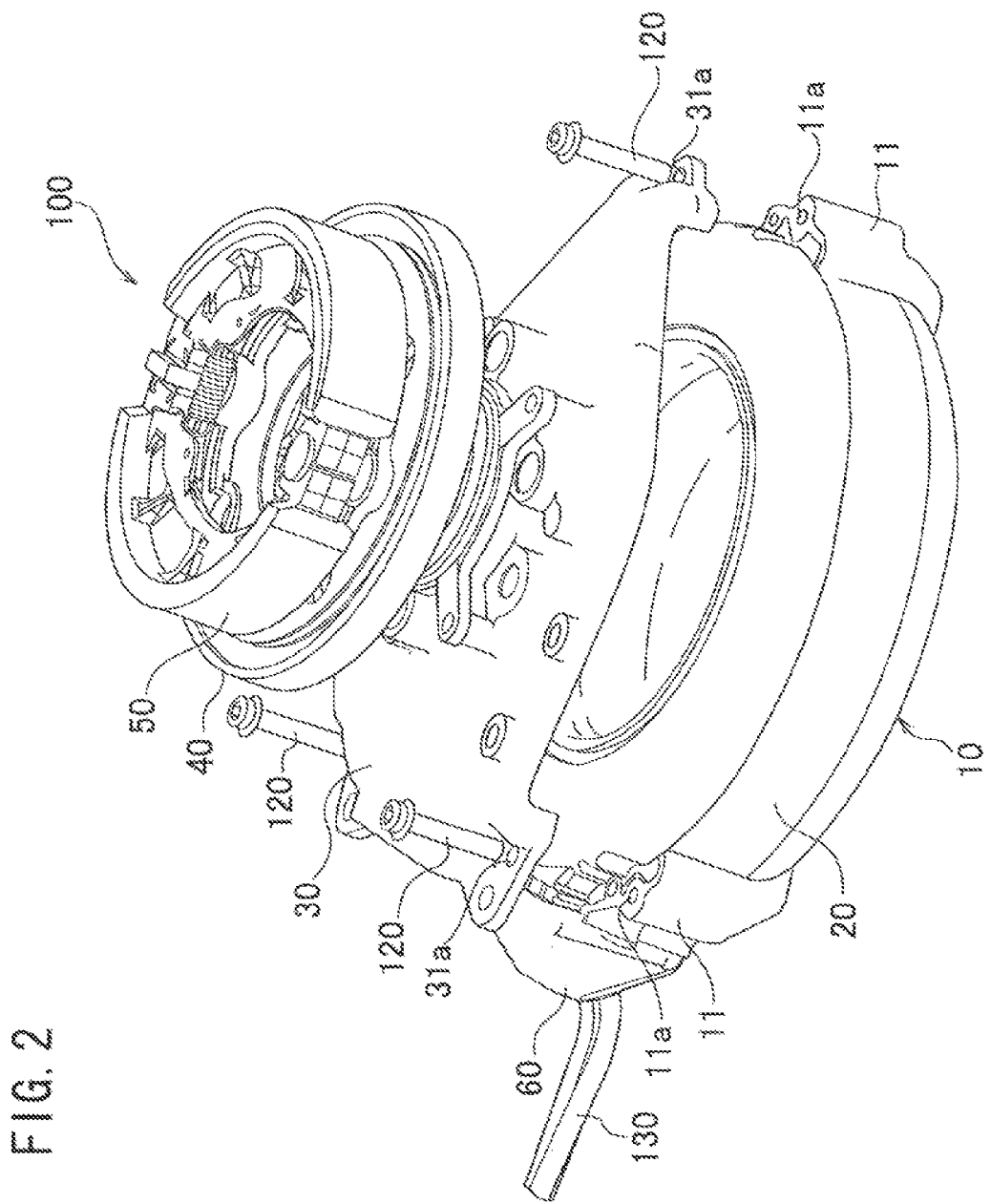
FIG. 2 is an exploded perspective view showing the electric motor 100 according to the first embodiment.
Figure 3:
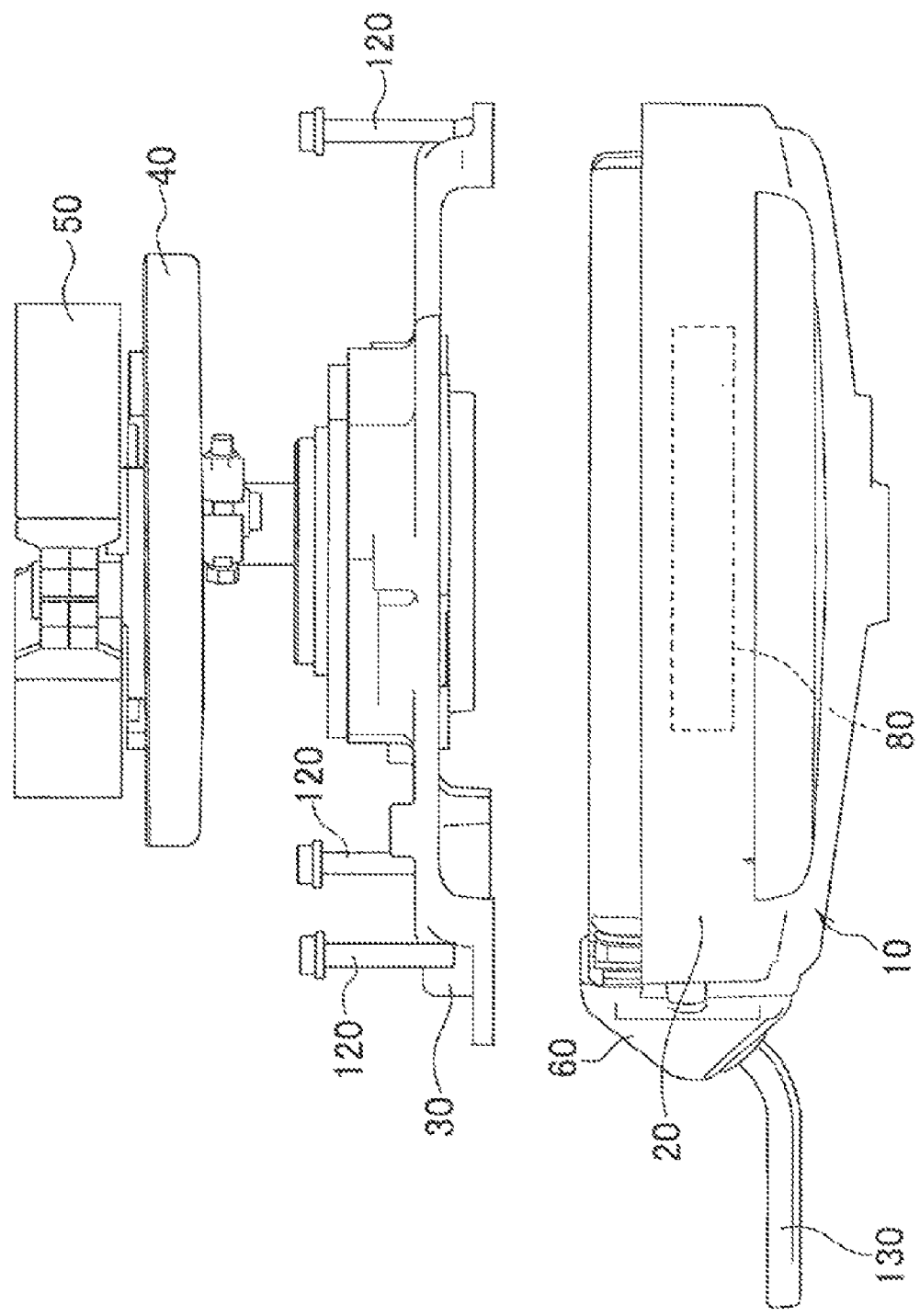
FIG. 3 is an exploded view showing the electric motor 100 according to the first embodiment.

Hereinafter, an electric motor according to a first embodiment will be described with reference to the drawings. FIG. 1 is a perspective view showing an electric motor 100 according to the first embodiment. FIG. 2 is an exploded perspective view showing the electric motor 100 according to the first embodiment. FIG. 3 is an exploded view showing the electric motor 100 according to the first embodiment.

As shown in FIGS. 1 to 3, the electric motor 100 includes a casing member 10, a resin 20, a cushion member 30, a holding member 40, a brake mechanism 50 and a terminal cover 60.

The casing member 10 holds a stator core 70 (not shown, refer to FIG. 5) to be described later. The casing member 10 is formed of a member having a predetermined rigidity, such as a metal member. The casing member 10 has guide ribs 11 having bolt holes 11a which have spiral grooves. The casing member 10 has an opening 13a (not shown, refer to FIG. 4), as will be described later.

Note that, an aluminum alloy or the like can be used as a material for forming the casing member 10.

The resin 20 molds the stator core 70. The resin 20 is also filled into the opening 13a provided in the casing member 10. Note that the resin 20 is formed of a member having a thermosetting property.

As the member forming the resin 20, a thermosetting resin filled with glass fiber is particularly preferably used.

The resin 20 is exposed from the casing member 10 at the opening 13a provided in the casing member 10 and also at an opening 13b (not shown, refer to FIGS. 10 and 11) provided between the casing member 10 and the cushion member 30.

The cushion member 30 is attached to the casing member 10. The cushion member 30 has bolt holes 31a for accepting bolts 120. The cushion member 30 is attached to the casing member 10 in a way that the bolts 120 which are inserted through the bolt holes 31a are screwed into the bolt holes 11a. Note that the cushion member 30 is formed of a member, such as an aluminum alloy or the like.

In the first embodiment, the casing member 10 constitutes a lower casing member which covers a bottom surface side of the stator core 70, and the cushion member 30 constitutes an upper casing member which covers a top surface side of the stator core 70.

As described above, the stator core 70 is housed between the casing member 10 and the cushion member 30. It should be noted that the casing member 10 and the cushion member 30 according to the first embodiment are collectively called a "casing member of the electric motor." Such a casing member of the electric motor may hold a rotor 80 (refer to FIG. 3) along with the stator core 70.

The holding member 40 holds the brake mechanism 50. The holding member 40 is attached to the cushion member 30 by bolt fastening or the like.

The brake mechanism 50 is a mechanism for braking the rotation of the rotor 80. The brake mechanism 50 has a brake arm 55. The rotation of an axle 111 provided to the rotor 80 is weakened in accordance with the rotation (movement) of the brake arm 55. For example, when the electric motor 100 is provided to an electric vehicle, the brake mechanism 50 is a drum-type brake which weakens the rotation of a tire provided to the electric vehicle.

Specifically, when the brake mechanism 50 with such a configuration weakens the rotation of a wheel having a tire mounted thereon (corresponding to a rear wheel 520 to be described later, refer to FIG. 19), the rotation of the axle 111 coupled to the wheel is weakened.

Accordingly, the rotor 80 is indirectly braked through a gear unit (not shown) disposed at the inside of the resin 20 and between the rotor 80 and the cushion member 30, a gear shaft (not shown) which couples the gear unit to the rotor 80, and the like.

Note that, when the rotor 80 is coupled to the axle 111, the rotor 80 is directly braked by the weakening of the rotation of the axle 111.

The terminal cover 60 protects a terminal provided at one end of a cable 130.

(Configuration of Casing Member)

Figure 4:
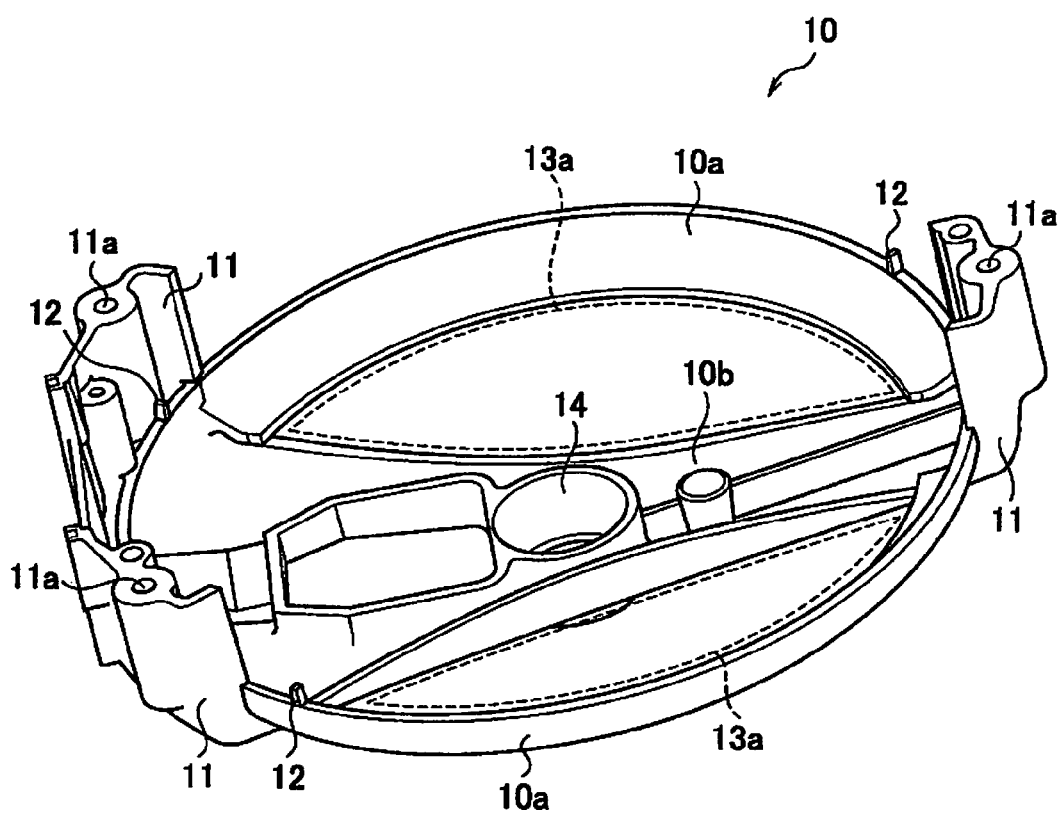
FIG. 4 is a perspective view showing a casing member 10 according to the first embodiment.

Hereinafter, the configuration of the casing member according to the first embodiment will be described with reference to the drawing. FIG. 4 is a perspective view showing the casing member 10 according to the first embodiment.

As shown in FIG. 4, the casing member 10 has the guide ribs 11, protrusions 12, the opening 13a (regions encompassed by broken lines in FIG. 4), and an axis hole 14.

Each of the guide ribs 11 has such a shape that the guide rib 11 extends along an outer peripheral portion (an outer peripheral portion 73a to be described later) of the stator core 70 (not shown). As described above, the guide rib 11 has the bolt hole 11a into which the bolt 120 is screwed.

Each of the protrusions 12 has such a shape that the protrusion 12 protrudes from a contact portion 10a which is in contact with a bottom surface portion of the stator core 70.

Note that, in the first embodiment, the contact portion 10a is formed in an annular shape. The contact portion 10a is provided with a crossing portion 10b with a bridge shape which lies between places facing to each other of the annular shape of the contact portion 10a. The axis hole 14 is provided at the central portion of the crossing portion 10b.

As described above, the resin 20 (not shown) is filled into the opening 13a. In the first embodiment, the opening 13a is provided in a bottom surface covering portion which is configured to cover the bottom surface portion of the stator core 70.

Specifically, in the first embodiment, the opening 13a according to an aspect of the present invention is a pair of openings which are formed of two window portions each encompassed by the contact portion 10a and the crossing portion 10b. The total area of the pair of the openings is approximately a half of the bottom area of the casing member 10.

The axis hole 14 is a hole for accepting the axle 111 (not shown) provided to the rotor 80.

(Configuration of Stator Core)

Figure 5:
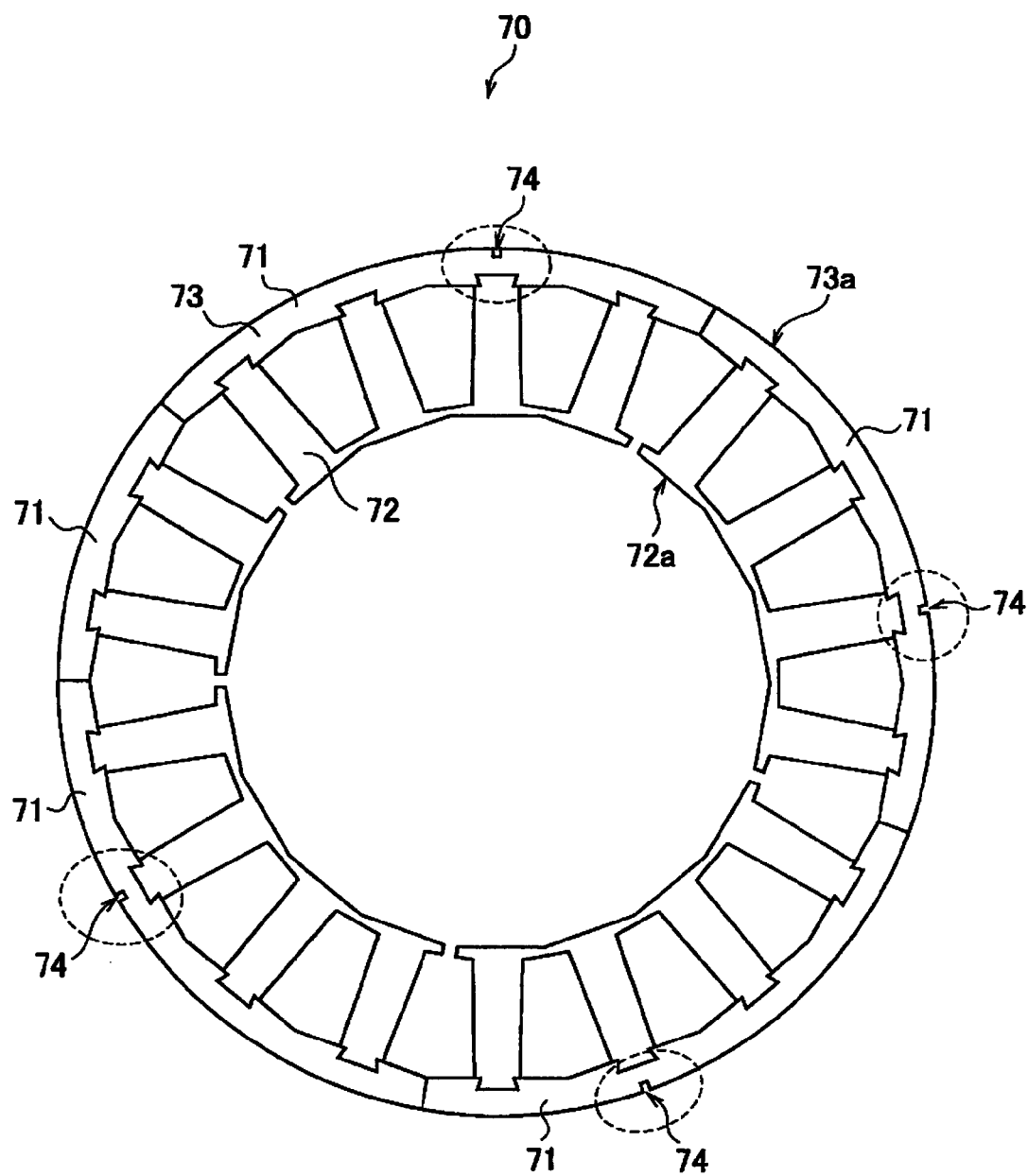
FIG. 5 is a plan view showing a stator core 70 according to the first embodiment.

Hereinafter, the configuration of the stator core according to the first embodiment will be described with reference to the drawing. FIG. 5 is a plan view showing the stator core 70 according to the first embodiment.

As shown in FIG. 5, the stator core 70 has an annular shape. The rotor (not shown) is disposed at the inside in the radial direction of the stator core 70. Specifically, the stator core 70 has a stator yoke 73 with an annular shape, and stator teeth 72 which protrude inwardly in the radial direction from an inner peripheral portion of the stator yoke 73. In addition, the stator core 70 is formed of multiple stator core segments 71.

A coil is wound around each of the stator teeth 72. Tip portions 72a of the stator teeth 72 form a cavity with, for example, a substantially cylindrical shape. Note that, as shown in Modified Example 1, the tip portions 72a of the stator teeth 72 may form a cavity with a polygonal column shape.

The outer peripheral portion 73a of the stator yoke 73 has grooves 74 which engage with the protrusions 12.

(Mounting of Stator Core on Casing Member)

Figure 6:
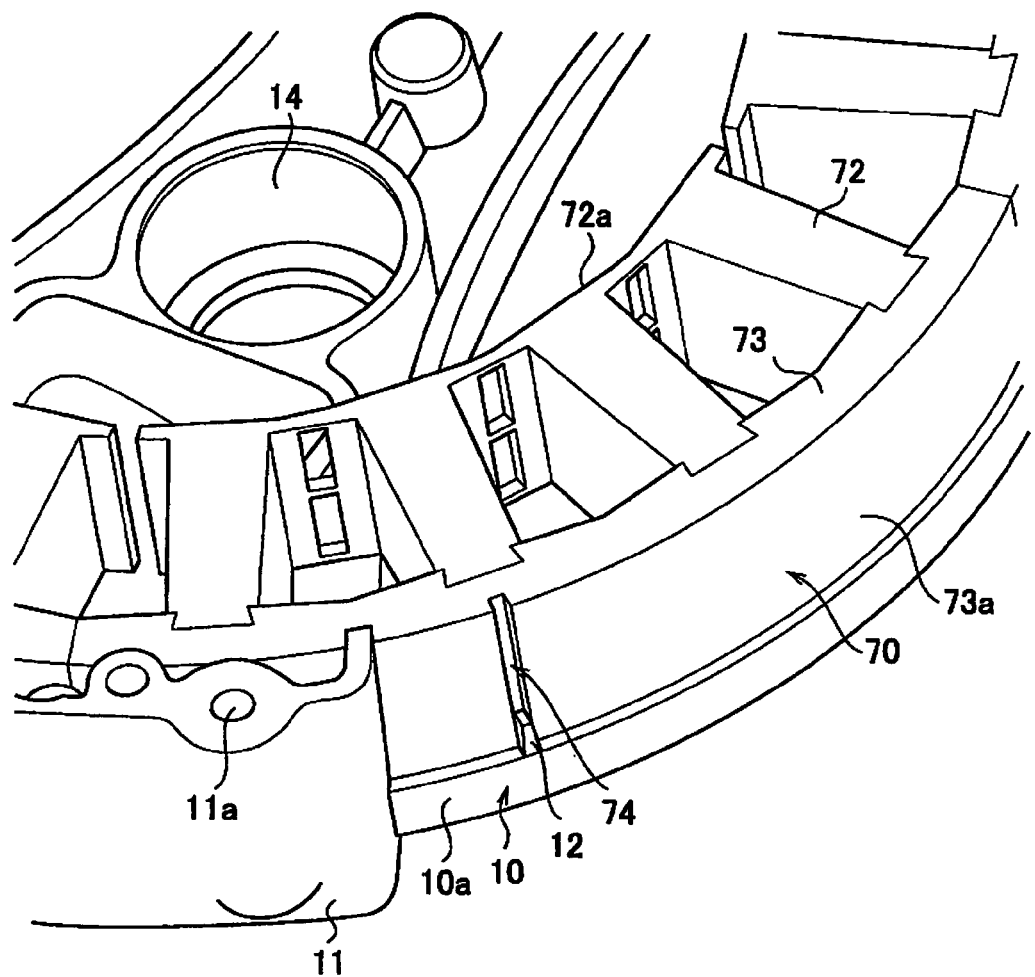
FIG. 6 is a partial enlarged view of the casing member 10 and the stator core 70 according to the first embodiment.
Figure 7:
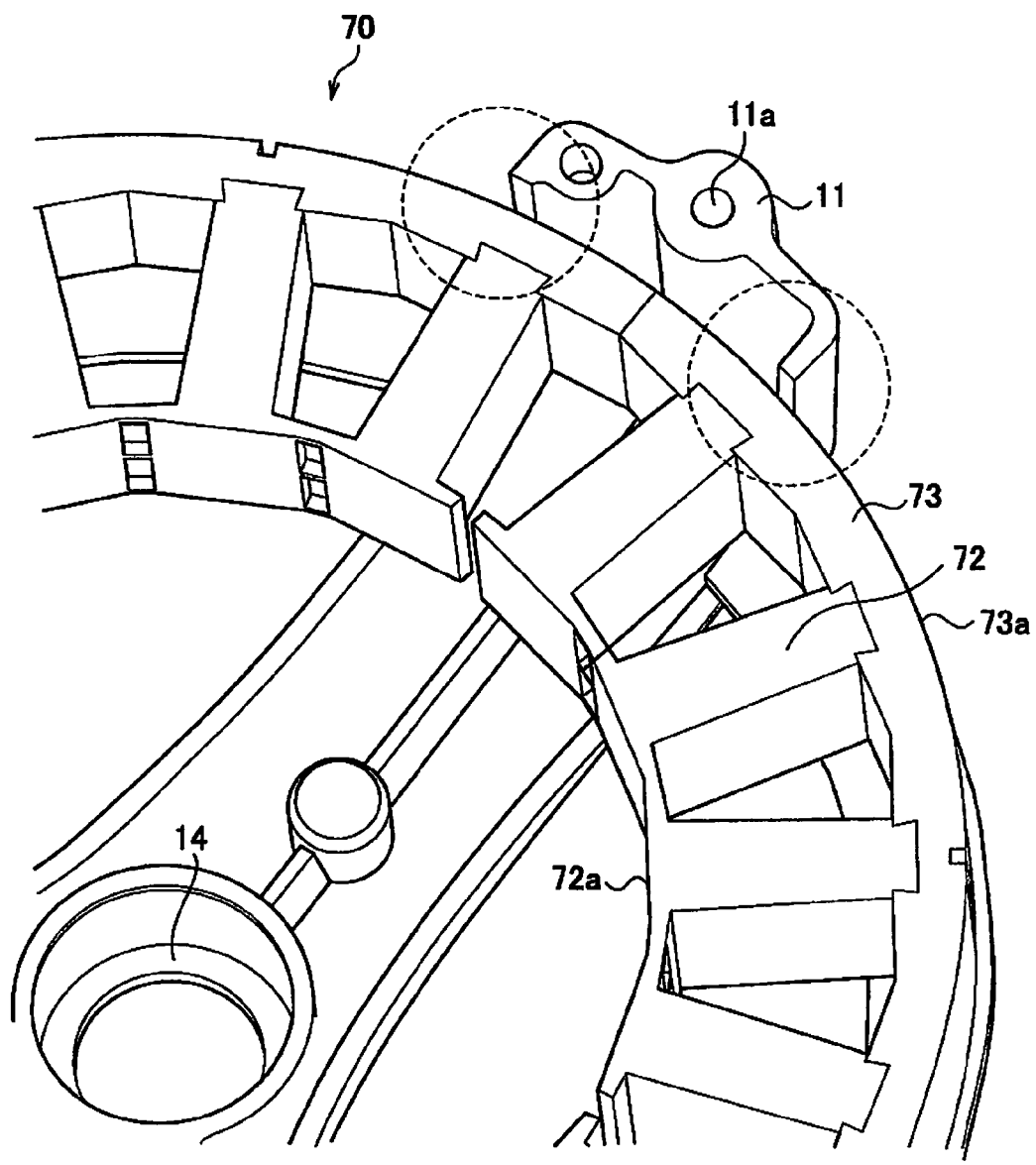
FIG. 7 is another partial enlarged view of the casing member 10 and the stator core 70 according to the first embodiment.
Figure 8:
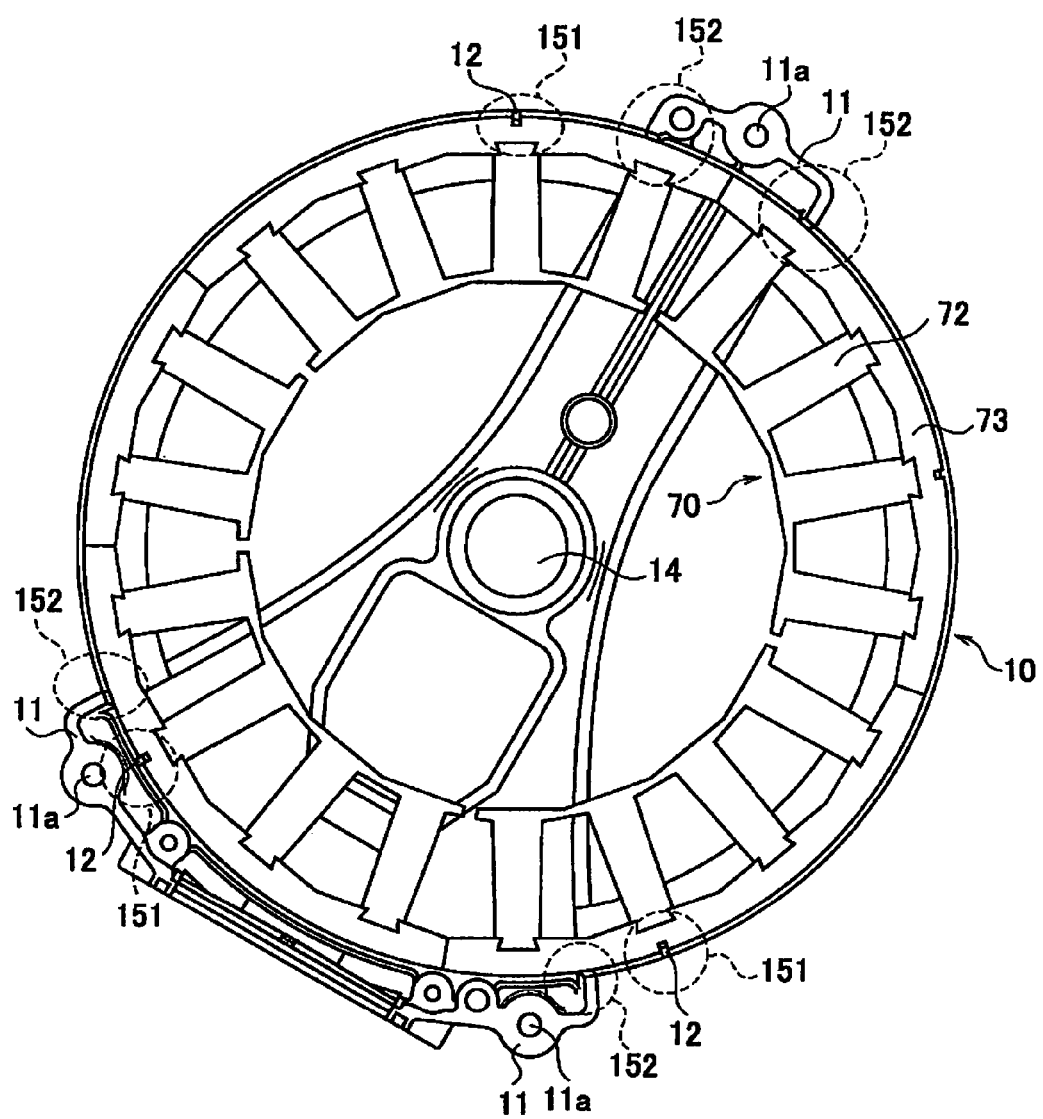
FIG. 8 is a view showing a state where the stator core 70 according to the first embodiment is mounted in the casing member 10.

Hereinafter, mounting of the stator core on the casing member according to the first embodiment will be described with reference to the drawings. FIGS. 6 and 7 are partial enlarged views of the casing member 10 and the stator core 70 according to the first embodiment. FIG. 8 is a view showing a state where the stator core 70 is mounted in the casing member 10 according to the first embodiment.

As shown in FIG. 6, in the mounting of the casing member 10 on the stator core 70, the protrusions 12 provided to the casing member 10 engage with the grooves 74 provided to the stator core 70. Specifically, the protrusions 12 and the grooves 74 have a function to position the stator core 70 with respect to the casing member 10. Moreover, at the time of filling the resin 20, the engagement of the protrusions 12 and the grooves 74 prevents the displacement of the stator core 70 in the circumferential direction.

As shown in FIG. 7, in the mounting of the casing member 10 on the stator core 70, the stator core 70 is mounted in the casing member 10 along the guide ribs 11 provided to the casing member 10. In other words, the guide ribs 11 have a function to guide the stator core 70. Moreover, at the time of filling the resin 20, the guide ribs 11 prevent the displacement of the stator core 70 in the radial direction.

As shown in FIG. 8, the position of the stator core 70 with respect to the casing member 10 is determined by the protrusions 12 and the grooves 74 at regions 151. In addition, the stator core 70 is mounted in the casing member 10, while being guided by the guide ribs 11 at regions 152.

(Filling of Resin)

Figure 9:
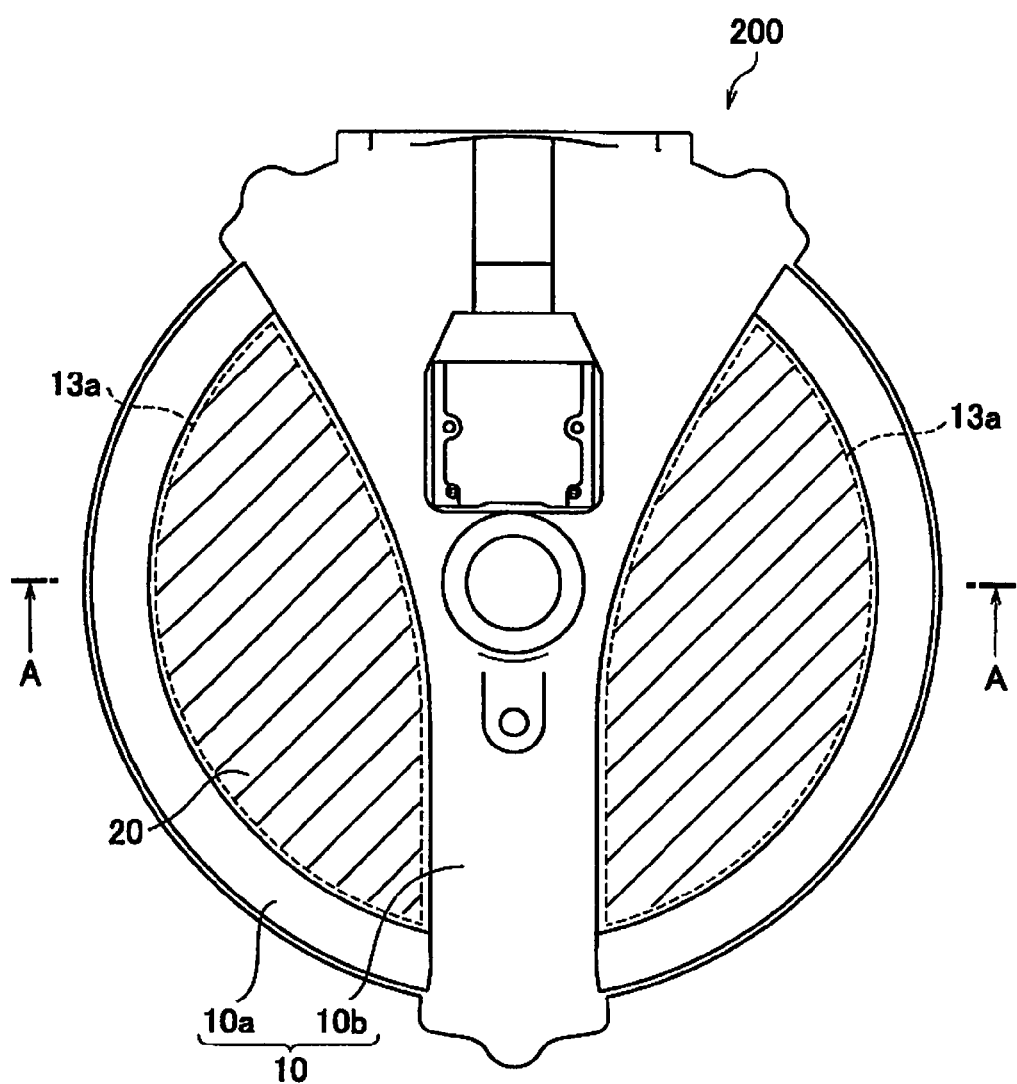
FIG. 9 is a view for describing filling of the resin 20 according to the first embodiment.
Figure 10:
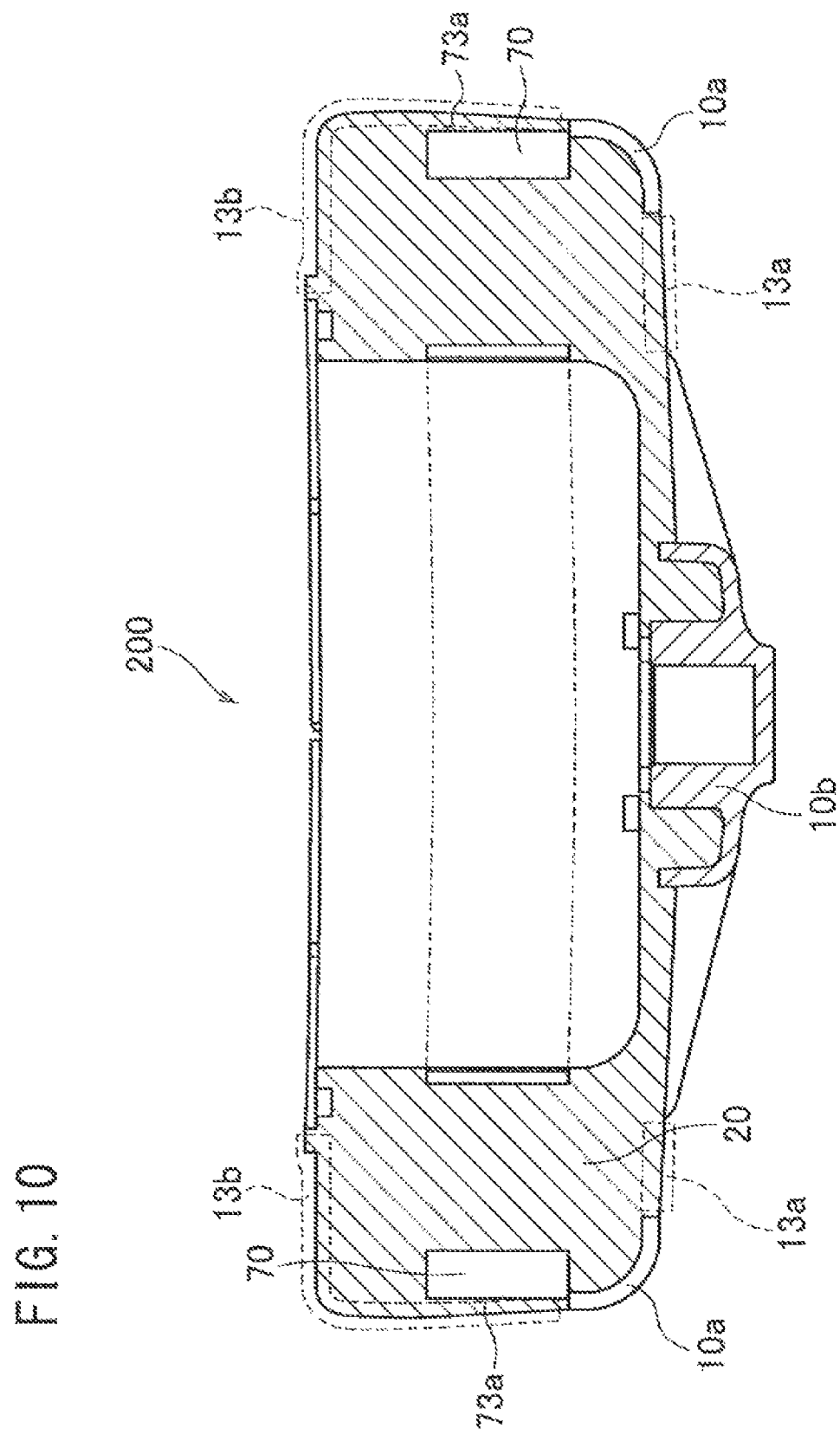
FIG. 10 is another view for describing the filling of the resin 20 according to the first embodiment.

Hereinafter, the filling of the resin according to the first embodiment will be described with reference to the drawings. FIGS. 9 and 10 are views showing a state where the resin 20 according to the first embodiment is filled.

Here, FIG. 9 is a view of a lower unit 200 formed of the casing member 10, the resin 20 and the stator core 70, viewed from the bottom surface side. FIG. 10 is an A-A cross-sectional view of the lower unit 200 shown in FIG. 9.

As shown in FIGS. 9 and 10, the resin 20 is filled into the opening 13a provided in the casing member 10.

As shown in FIG. 10, the resin 20 molding the outer peripheral portion (the outer peripheral portion 73a described above) of the stator core 70 is exposed from the casing member 10. In other words, as a part of a structure for housing the stator core 70, the resin 20 is provided instead of the casing member 10.

As described above, the lower unit 200 is a unit formed of the casing member 10 and the stator core 70 which are integrated by the resin 20. In the lower unit 200, the casing member 10 and the resin 20 holds the stator core 70.

(Exposure of Resin)

As shown in FIG. 9, the resin 20 is exposed from the casing member 10 at the opening 13a. Accordingly, the resin 20 is in direct contact with the air at the pair of the openings encompassed by the contact portion 10a and the crossing portion 10b. As described above, the total area of the pair of the openings is approximately a half of the area of the bottom surface of the casing member 10.

Moreover, as shown in FIG. 10, the resin 20 is exposed from the casing member 10 at the opening 13b (the regions encompassed by broken lines in FIG. 10) provided between the casing member 10 and the cushion member 30. In this way, the outer peripheral portion of the resin 20 is in direct contact with the air at the pair of the openings encompassed by the casing member 10 and the cushion member 30.

Here, in the first embodiment, the opening 13b according to an aspect of the present invention is a pair of openings formed of two window portions each encompassed by the casing member 10 and the cushion member 30. It should be noted that, in this case, a "casing member of the electric motor" is formed of the casing member 10 and the cushion member 30.

Figure 11:
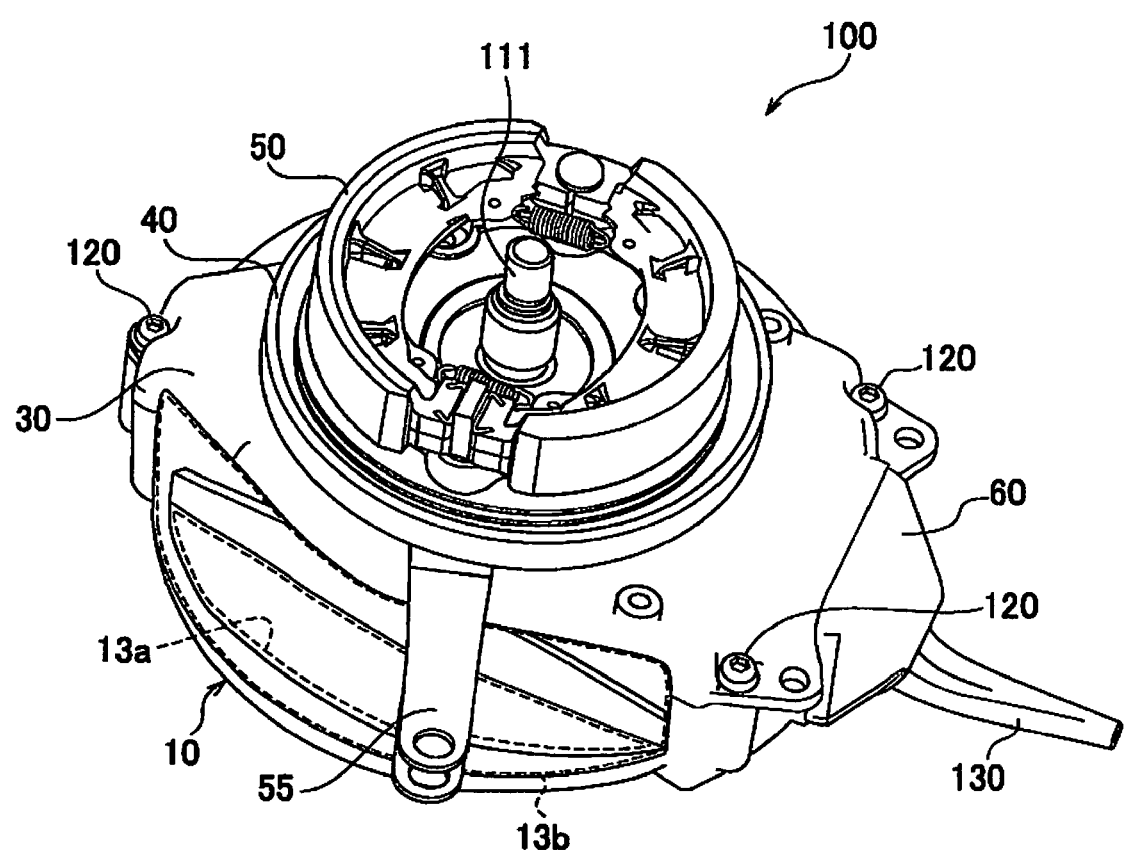
FIG. 11 is a view showing the configuration of an opening 13b according to the first embodiment.

FIG. 11 is a view showing the configuration of the opening 13b (the region encompassed by a broken line in FIG. 11). As shown in FIG. 11, the opening 13b is formed in a side surface of the "casing member of the electric motor" formed of the casing member 10 and the cushion member 30. In the first embodiment, the total area of the pair of the openings forming the opening 13b is approximately two thirds of the area of the side surface of the "casing member of the electric motor". Note that the resin 20 is omitted in FIG. 11.

(Mounting of Holding Member)

Figure 12:
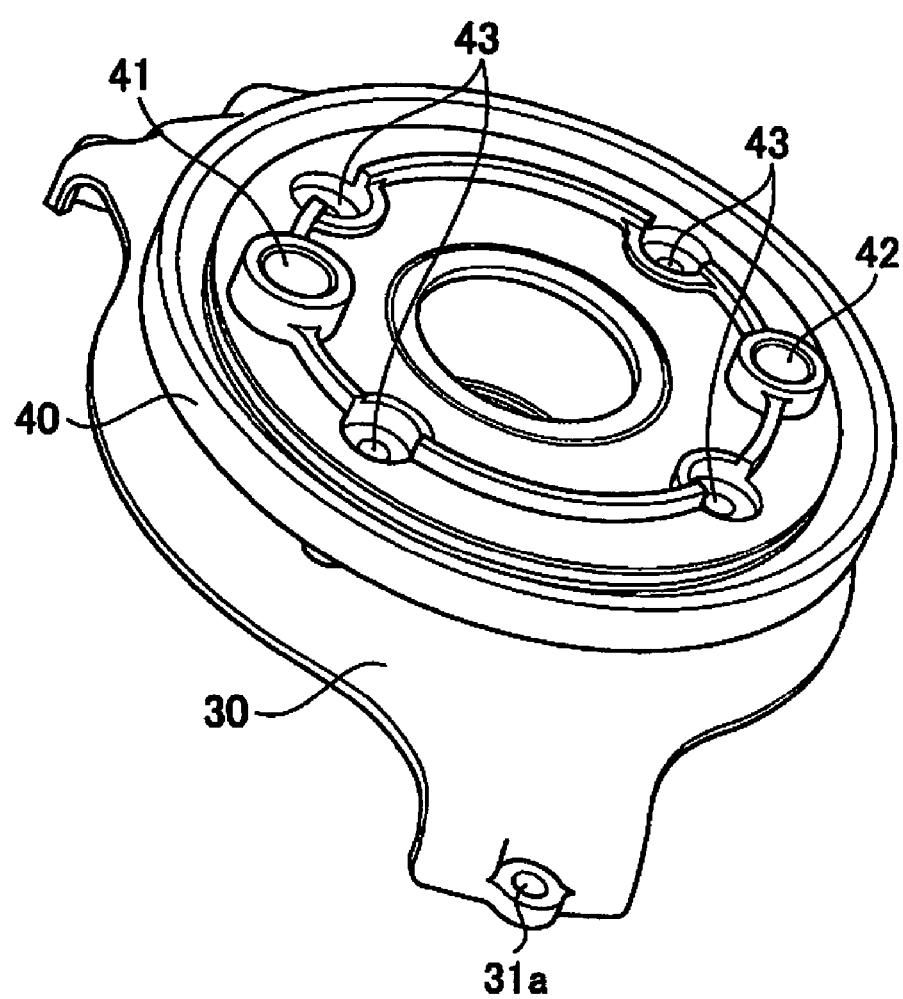
FIG. 12 is a view showing a state where a holding member 40 according to the first embodiment is mounted on a cushion member 30.

Hereinafter, mounting of the holding member according to the first embodiment will be described with reference to the drawing. FIG. 12 is a view showing a state where the holding member 40 according to the first embodiment is mounted on the cushion member 30.

As shown in FIG. 12, the holding member 40 has a cam hole 41, an anchor pin hole 42 and bolt holes 43.

The cam hole 41 accepts a cam 51 (not shown, refer to FIG. 13) provided to the brake mechanism 50. The cam 51 provided to the brake mechanism 50 is inserted into the cam hole 41.

The anchor pin hole 42 accepts an anchor pin 52 (not shown, refer to FIG. 13) provided to the brake mechanism 50. The anchor pin 52 provided to the brake mechanism 50 is inserted into the cam hole 41.

The bolt holes 43 are holes into which bolts (not shown) for attaching the holding member 40 to the cushion member 30 are screwed.

(Mounting of Brake Mechanism)

Figure 13:
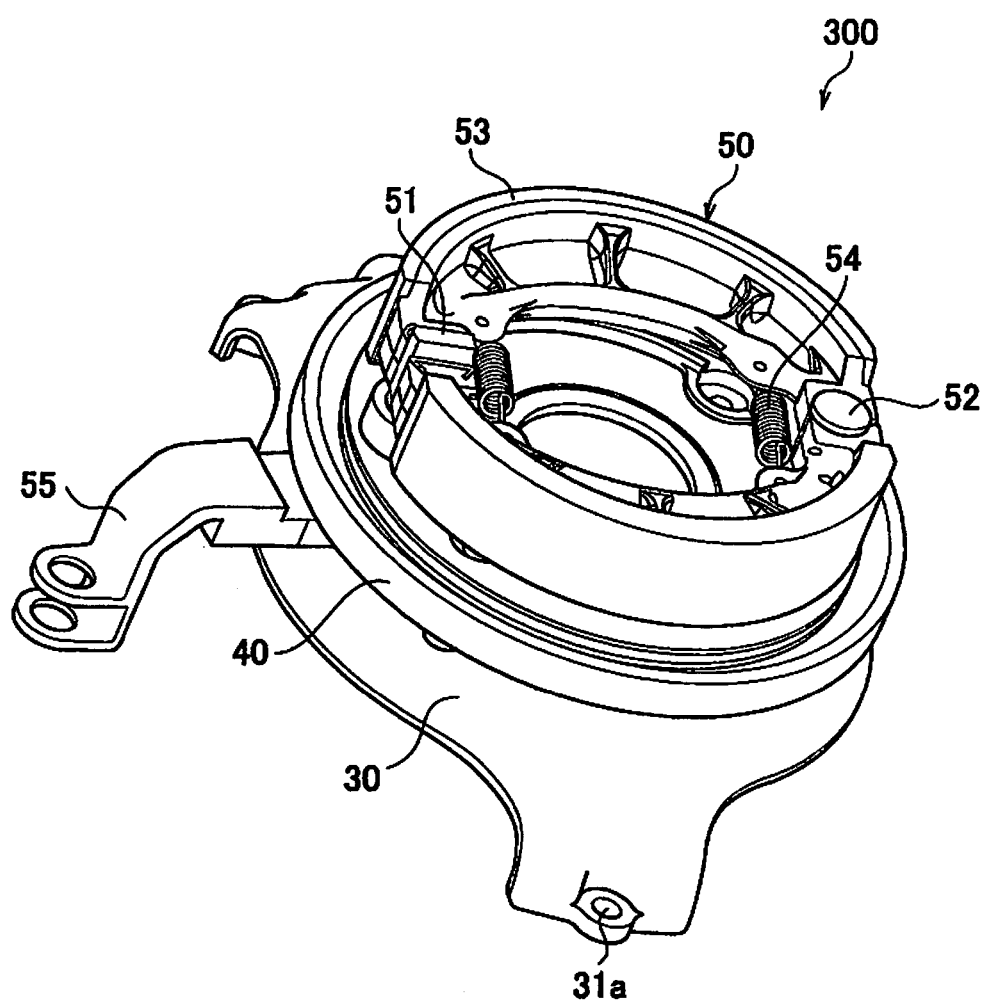
FIG. 13 is a view showing a state where a brake mechanism 50 according to the first embodiment is mounted on the holding member 40 and the cushion member 30.

Hereinafter, mounting of the brake mechanism according to the first embodiment will be described with reference to the drawing. FIG. 13 is a view showing a state where the brake mechanism 50 according to the first embodiment is mounted on the holding member 40 and the cushion member 30.

As shown in FIG. 13, the brake mechanism 50 has the cam 51, the anchor pin 52, a brake shoe 53, springs 54, and a brake arm 55.

The cam 51 is inserted into the cam hole 41 provided in the holding member 40. The cam 51 rotates in accordance with the rotation (movement) of the brake arm 55.

The anchor pin 52 is inserted into the anchor pin hole 42 provided in the holding member 40. The anchor pin 52 constitutes the fulcrum of the brake shoe 53.

When the brake shoe 53 is brought into contact with an inner peripheral portion of a tire provided to an electric vehicle, a friction force is generated between the inner peripheral portion of the tire and the brake shoe 53. The brake shoe 53 extends outwardly in the radial direction in accordance with the rotation of the cam 51, while using the anchor pin 52 as the fulcrum. With this extension, the brake shoe 53 is brought into contact with the inner peripheral portion of the tire.

When the cam 51 is returned to the initial position, the springs 54 generate a force to contract the brake shoe 53 inwardly in the radial direction.

The brake arm 55 is coupled to a brake lever or the like provided to the electric vehicle. As described above, in accordance with the rotation (movement) of the brake arm 55, the cam 51 rotates, and the brake shoe 53 extends outwardly in the radial direction, while using the anchor pin 52 as the fulcrum. With this extension, a friction force is generated between the brake shoe 53 and the inner peripheral portion of the tire.

Here, as an example of the brake mechanism 50, the drum-type brake has been described; however, embodiments are not limited thereto. The brake mechanism 50 may have a different configuration like a disk-type brake.

Here, the cushion member 30, the holding member 40 and the brake mechanism 50 form an upper unit 300. As described above, the upper unit 300 is attached to the lower unit 200 by the bolts 120 (refer to FIGS. 1 to 3).

(Filling Method of Resin)

Figure 14:
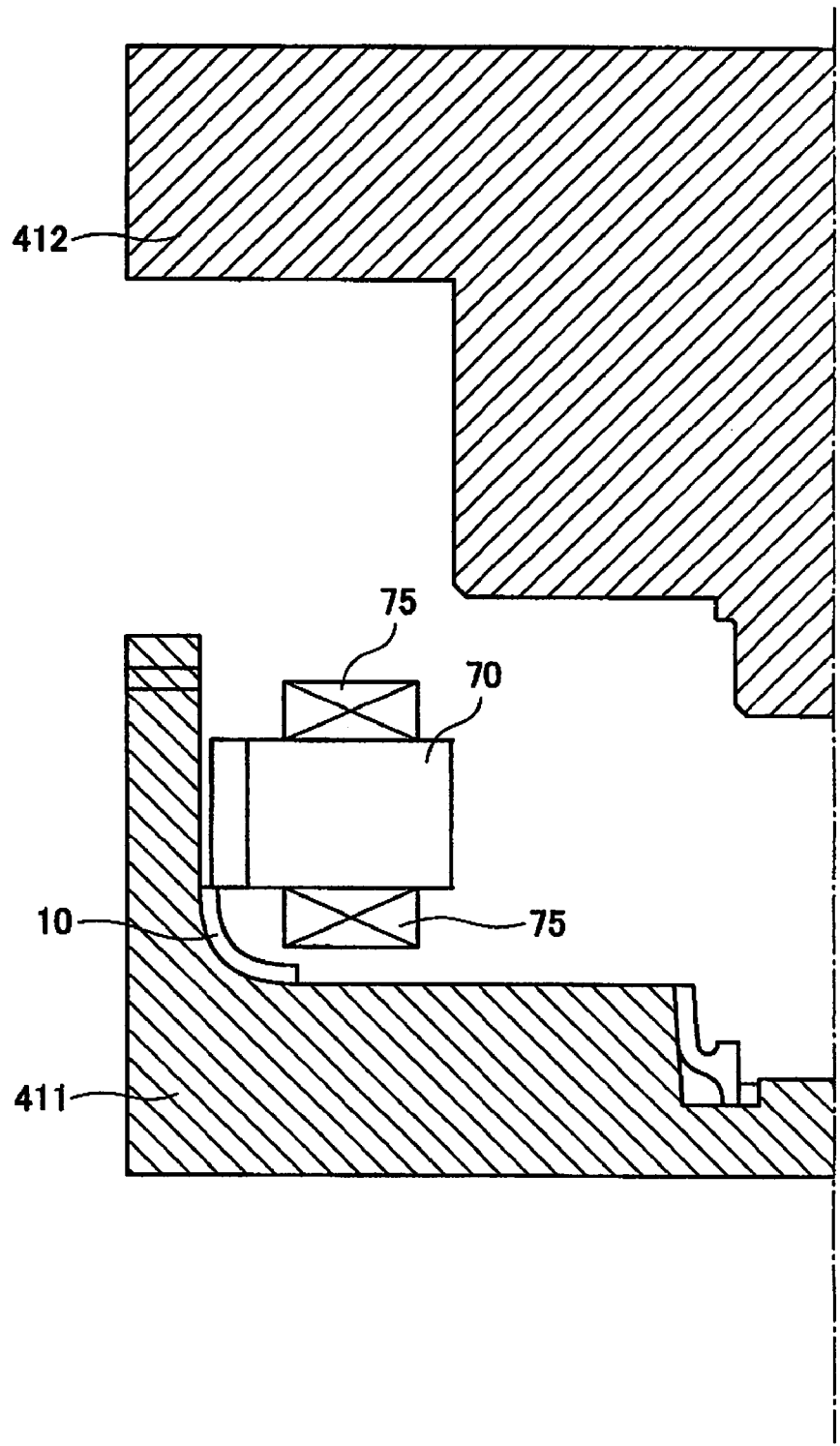
FIG. 14 is a view for describing a filling method of the resin 20 according to the first embodiment.
Figure 15:
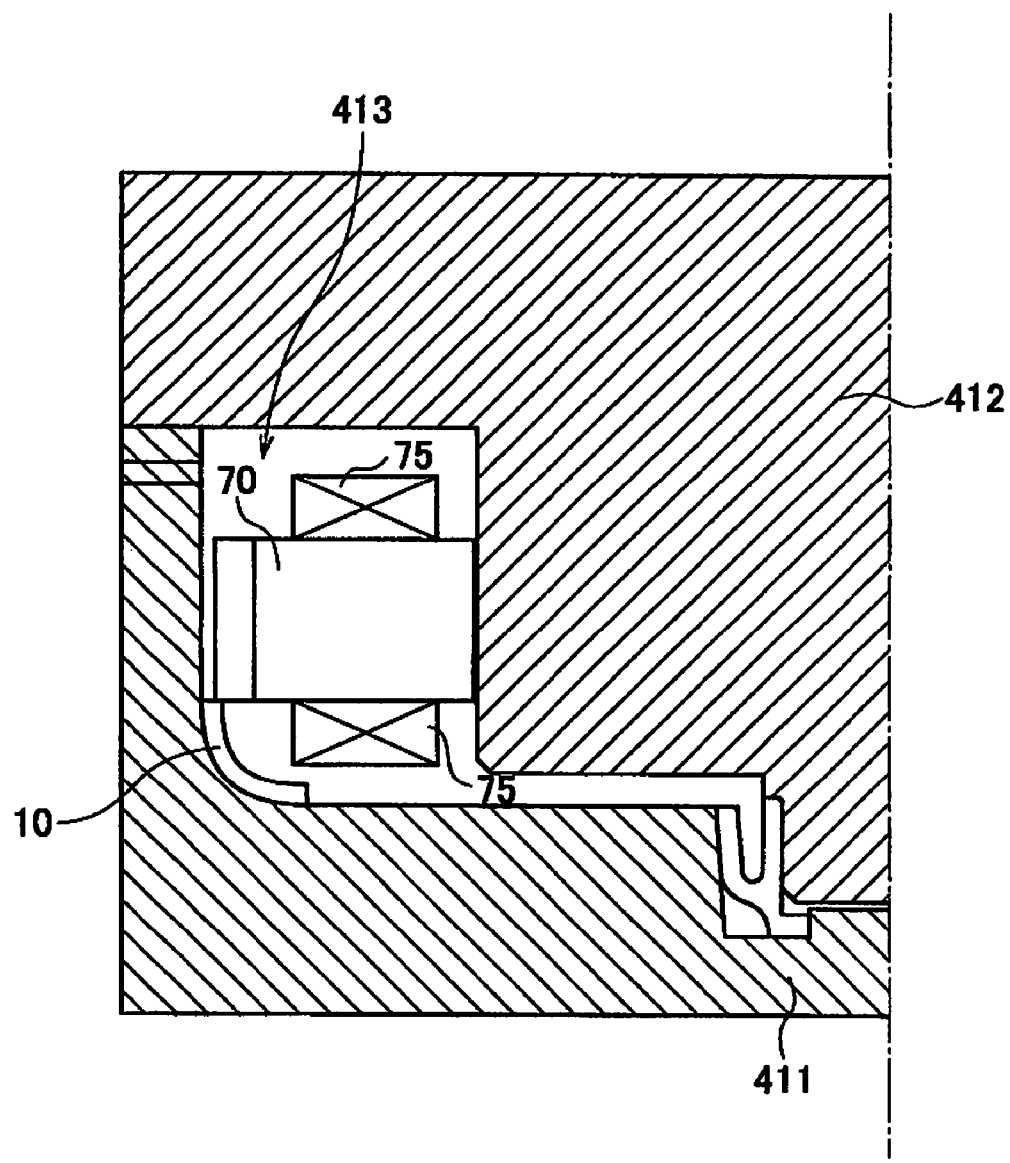
FIG. 15 is another view for describing the filling method of the resin 20 according to the first embodiment.
Figure 16:
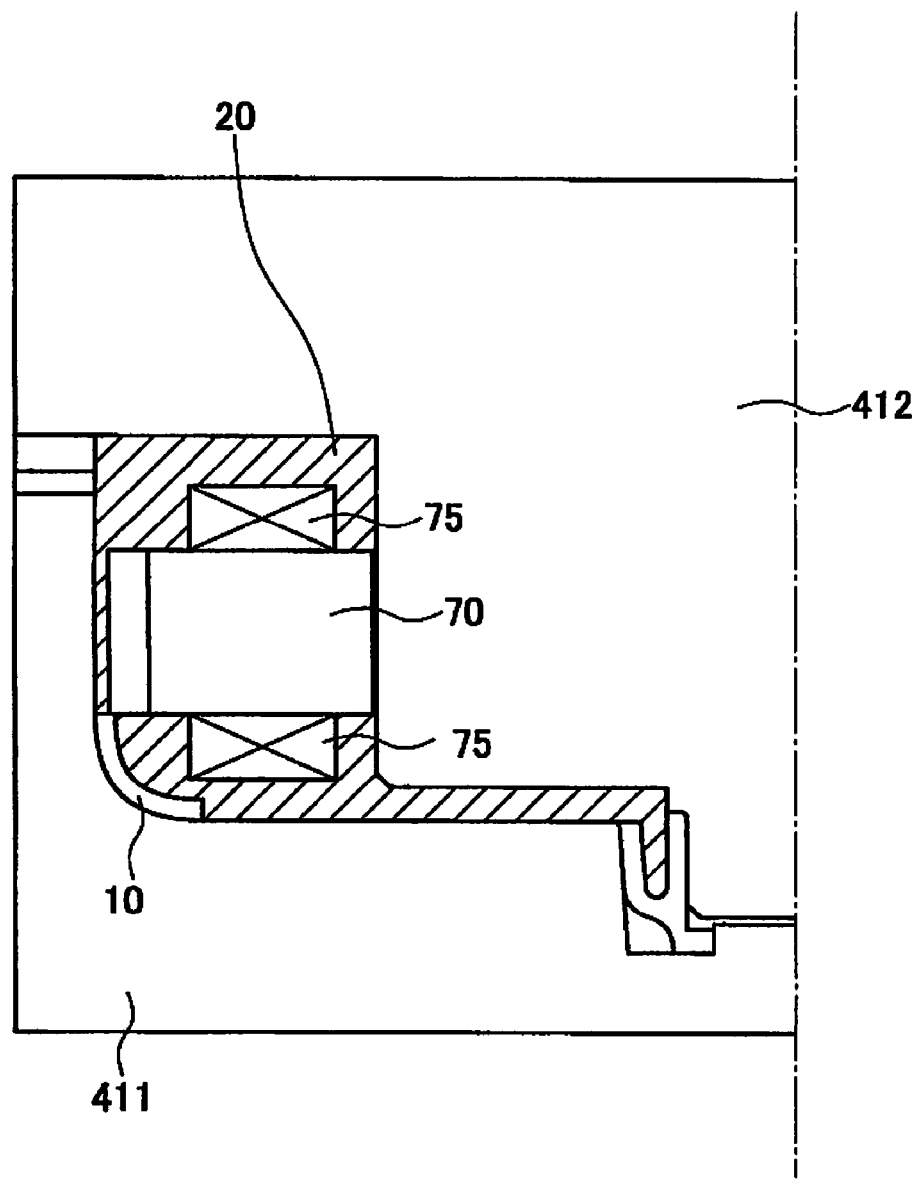
FIG. 16 is still another view for describing the filling method of the resin 20 according to the first embodiment.

Hereinafter, a filling method of the resin according to the first embodiment will be described with reference to the drawings. FIGS. 14 to 16 are views for describing the filling method of the resin 20 according to the first embodiment. It should be noted that, at the time of filling the resin 20, coils 75 have already wound around the stator teeth 72 provided to the stator core 70.

First, as shown in FIG. 14, the casing member 10 with the stator core 70 mounted thereon is disposed in a mold formed of a lower mold 411 and an upper mold 412. Second, as shown in FIG. 15, the lower mold 411 or the upper mold 412 is moved to close the mold formed of the lower mold 411 and the upper mold 412. Third, as shown in FIG. 16, the resin 20 is filled into the opening 413 formed between the lower mold 411 and the upper mold 412.

Finally, after the resin 20 cures, the mold formed of the lower mold 411 and the upper mold 412 is opened, and the lower unit 200 is taken out.

(Operations and Effects)

In the first embodiment, the resin 20 is filled into the opening 13a provided to the casing member 10. Accordingly, the resin 20 filled into the opening 13a results in the generation of the force to prevent the resin from rotating. As a result, the contents housed in the casing member 10 can be prevented from rotating.

In the first embodiment, the resin 20 is exposed from the casing member 10 at the opening 13a provided in the casing member 10. Accordingly, heat generated at the stator core 70 can be radiated effectively to the outside of the casing member 10 through the opening 13a.

In the first embodiment, the resin 20 is exposed from the casing member 10 and from the cushion member 30 at the opening 13b provided between the casing member 10 and the cushion member 30. Accordingly, the heat generated at the stator core 70 can be radiated effectively through the opening 13b.

In the first embodiment, the lower unit 200 is a unit formed of the casing member 10 and the stator core 70 which are integrated by the resin. Accordingly, it is unnecessary to attach the stator core 70 to the casing member 10 with bolts or the like. As a result, the lower unit 200 can be lightened in weight.

In the first embodiment, the resin 20 molding the outer peripheral portion 73a of the stator core 70 is exposed from the casing member 10. In other words, as apart of the structure for housing the stator core 70, the resin 20 is provided instead of the casing member 10. With this, the casing member 10 can be made smaller in size and lighter in weight. As a result, the electric motor 100 can be made smaller in size and lighter in weight.

In the first embodiment, the protrusions 12 are provided to the casing member 10, and the grooves 74 which engage with the protrusions 12 are provided in the stator core 70. Accordingly, it is easy to position the stator core 70 relative to the casing member 10. Moreover, at the time of filling the resin 20, the engagement of the protrusions 12 and the grooves 74 makes it possible to prevent the displacement of the stator core 70 in the circumferential direction.

In the first embodiment, the casing member 10 is provided with the guide ribs 11 each of which extends along the outer peripheral portion 73a of the stator core 70. Accordingly, the stator core 70 is easily mounted in the casing member 10. In addition, at the time of filling the resin 20, the guide ribs 11 make it possible to prevent the displacement of the stator core 70 in the circumferential direction.

The positioning of the stator core 70 and the prevention of the displacement of the stator core 70 are effective, particularly when the stator core 70 is formed of the multiple stator core segments 71. Specifically, in such a case, the connection of the stator core segments 71 may be made loose to some extent. In this connection, according to the first embodiment, the displacement occurring at the points where the stator core segments 71 are connected with each other can be prevented.

In the first embodiment, the brake mechanism 50 is attached to the casing member 10 with the cushion member 30 interposed therebetween. In other words, the brake mechanism 50 is not directly attached to the casing member 10. The cushion member 30 cushions an impact and a shearing force applied to the lower unit 200 (the casing member 10) in accordance with the operation of the brake mechanism 50. With this, the life of the electric motor 100 can be made longer.

MODIFIED EXAMPLE 1

Hereinafter, Modified Example 1 of the first embodiment will be described. In the following description, the differences from the first embodiment will mainly be described.

Although details for the first embodiment are not described, tip portions 72a of stator teeth 72 form a cavity with a polygonal columnar shape in Modified Example 1. In a lower unit 200, parts of the tip portions 72a of the stator teeth 72 and a resin 20 form a cylindrical cavity for housing a rotor capable of rotating about an axle 111.

Figure 17:
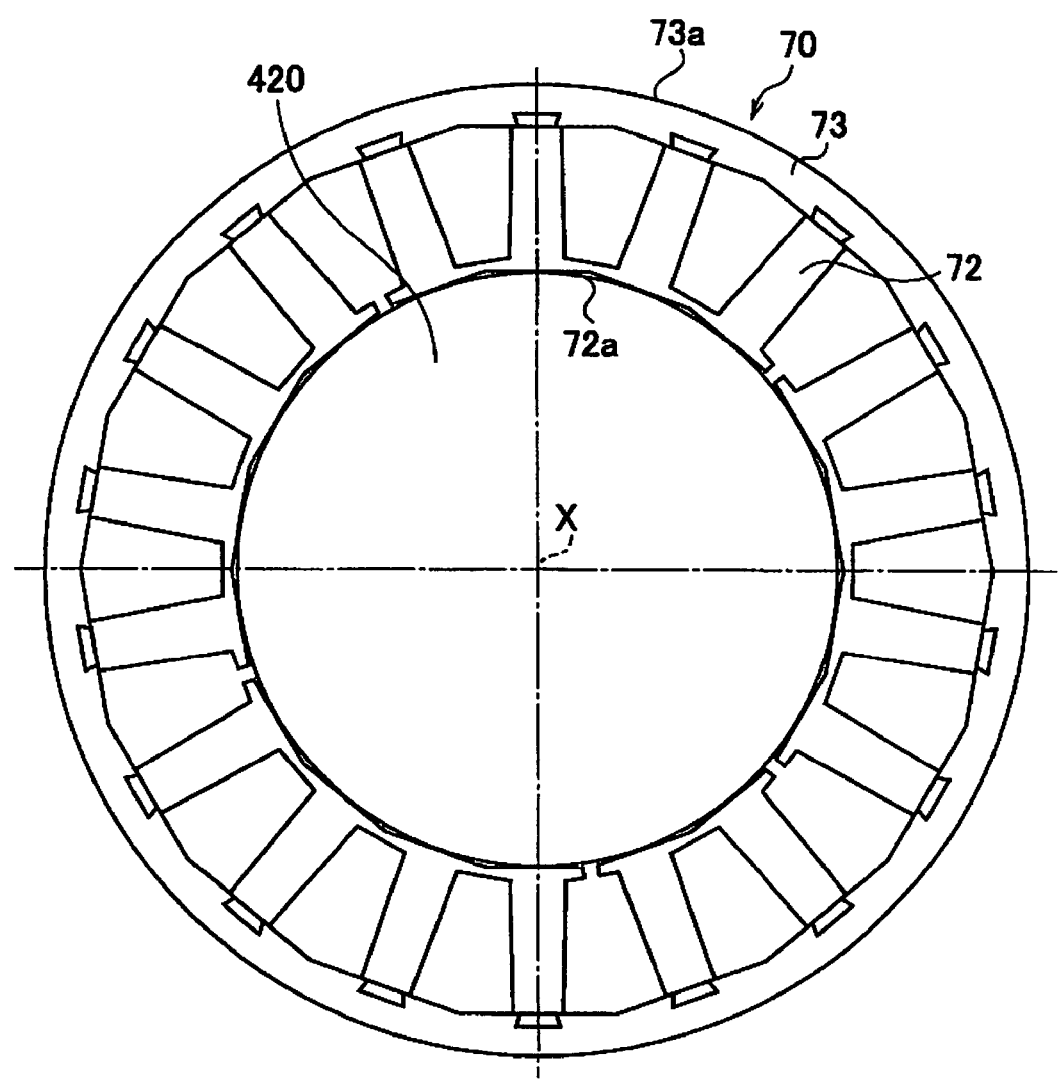
FIG. 17 is a view for describing a formation method of a cavity for housing a rotor in Modified Example 1 of the first embodiment.
Figure 18:
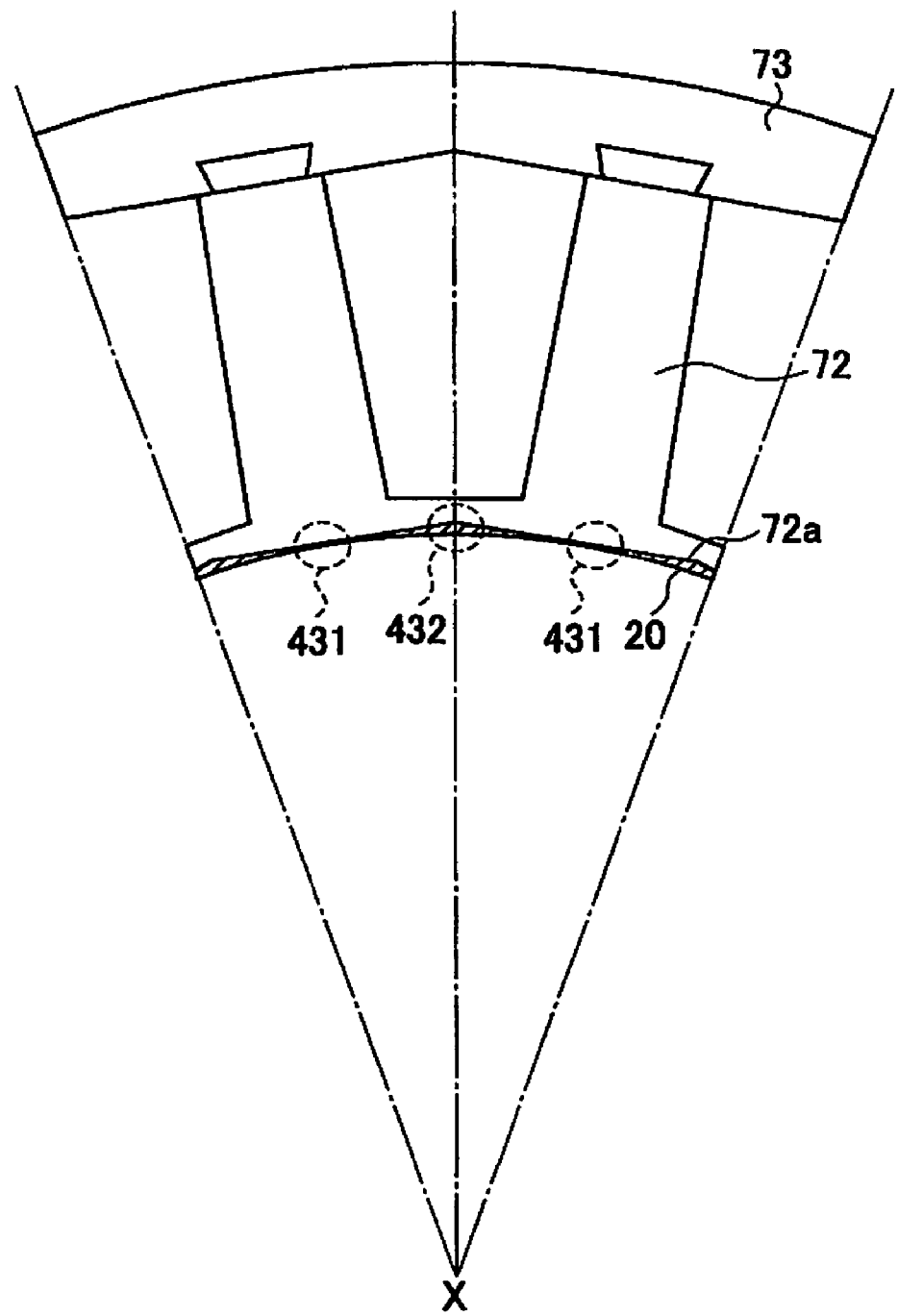
FIG. 18 is another view for describing the formation method of the cavity for housing the rotor in Modified Example 1 of the first embodiment.

FIGS. 17 and 18 are views for describing a method of forming the cavity for housing the rotor (not shown) in the lower unit 200 according to Modified Example 1.

As shown in FIG. 17, the cavity formed of the tip portions 72a of the stator teeth 72 has a polygonal cross-section. At the time of filling the resin 20, an axis center mold 420 is disposed in the cavity formed of the tip portions 72a of the stator teeth 72.

The axis center mold 420 has a cylindrical shape. The axis center mold 420 has a circular cross-section, a center of the circular cross-section is identical with the rotation center X of the rotor.

Here, the cavity formed of the tip portions 72a of the stator teeth 72 has a polygonal cross-section whose incircle is identical to the circle forming a cross-section of the axis center mold 420. In other words, the cavity formed of the tip portions 72a of the stator teeth 72 has an incircle which is identical to the circle centered at the rotation center X of the rotor.

As shown in FIG. 18, the tip portions 72a are in contact with the axis center mold 420 at the regions 431. In other words, parts of the tip portions 72a are exposed to the cavity formed by using the axis center mold 420 at the regions 431. It should be noted that the parts of the tip portions 72a exposed to the cavity form lines tangential to the circle centered at the rotation center X of the rotor.

Meanwhile, openings are formed at regions 432 between the axis center mold 420 and each of the tip portions 72a. Accordingly, the resin 20 is filled into the openings formed at the regions 432.

In this way, the cavity for housing the rotor is formed by using the axis center mold 420. Moreover, the cavity for housing the rotor is formed of the part of the tip portions 72a of the stator teeth 72 and the resin 20. In other words, the part of the tip portions 72a of the stator teeth 72 and the resin 20 form a cylindrical cavity having a circular cross-section, a center of the circular cross-section is identical with the rotation center X of the rotor.

(Operations and Effects)

In Modified Example 1, the cavity with a substantially cylindrical shape for housing the rotor is formed of the part of the tip portions 72a of the stator teeth 72 and the resin 20. As a result, parts of the tip portions 72a of the stator teeth 72 exposed to the cavity are reduced. Accordingly, an anti-rust effect on the tip portions 72a of the stator teeth 72 can be obtained. Moreover, since the stator teeth 72 are embedded in the resin 20, the strength of the stator teeth 72 is improved.

Incidentally, it should be noted that, in a case where entire parts of the tip portions 72a of the stator teeth 72 are covered with the resin 20, in other words, in a case where the entire inner wall of the cavity is formed of the resin 20, the performances (such as the output and efficiency) of the electric motor 100 are lowered. Moreover, at the time of filling the resin 20, the position of the axis center mold 420 may be displaced, and thereby the rotor may be decentered.

[Second Embodiment]

Hereinafter, a second embodiment will be described with reference to the drawings. Specifically, in the second embodiment, amounting structure of a casing member 10, a cushion member 30 and a holding member 40 will be described.

Figure 19:
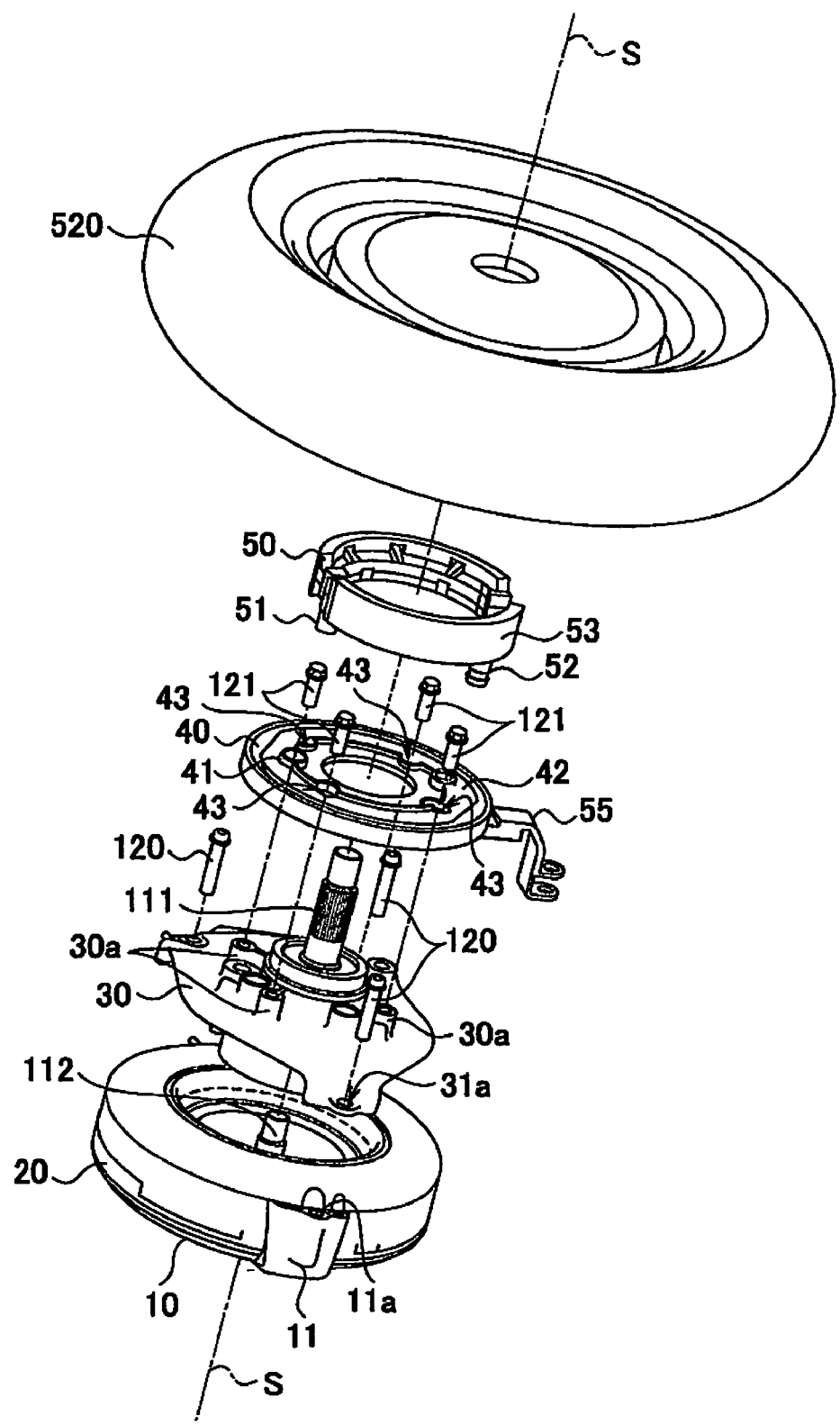
FIG. 19 is an exploded perspective view showing an electric motor 100 according to a second embodiment.
Figure 20:
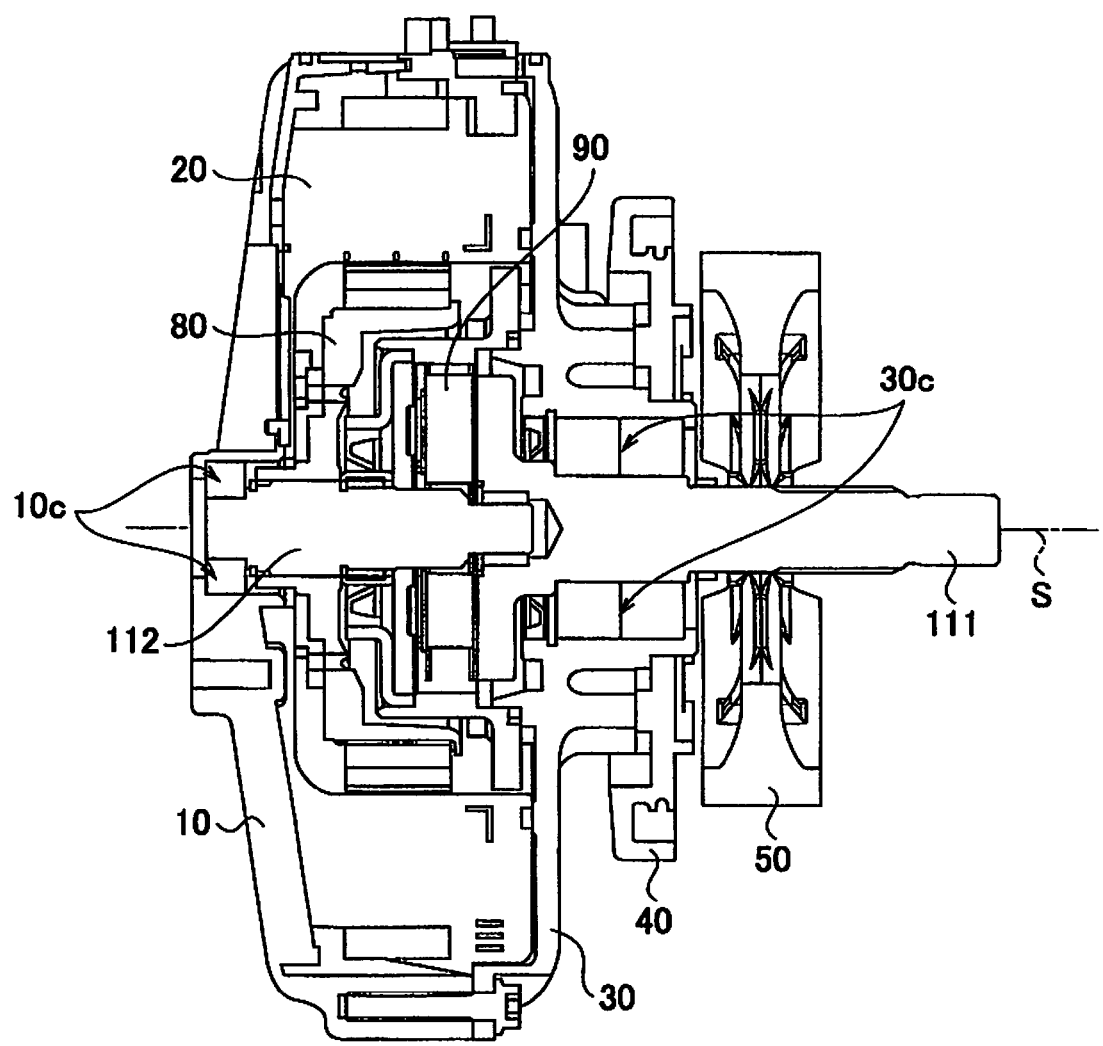
FIG. 20 is a cross-sectional view showing the electric motor 100 according to the second embodiment.

FIG. 19 is an exploded perspective view showing an electric motor 100 according to the second embodiment. FIG. 20 is a cross-sectional view showing the electric motor 100 according to the second embodiment. Note that, in FIG. 19, a rear wheel 520 for housing the brake mechanism 50 is shown.

As shown in FIG. 19, a center axis of the rear wheel 520 is provided coaxially with rotation axes S of the axle 111, and a gear shaft 112 disposed inside a resin 20. Moreover, the center axis of each of the resin 20, a holding member 40 and the brake mechanism 50 is set coaxially with the rotation axes S.

The cushion member 30 is fixed to the resin 20 in a way that bolts 120 are screwed into bolt holes 11a of guide ribs 11 through the bolt holes 31a of the cushion member 30. In this case, an outer peripheral portion of the resin 20 is exposed from the cushion member 30.

The holding member 40 is fixed to the cushion member 30 in a way that bolts 121 are screwed into rib holes 30a of the cushion member 30 through bolt holes 43 of the holding member 40.

Here, the rib holes 30a are each formed into a convex shape in a top surface of the cushion member 30. Accordingly, the holding member 40 is in contact with only upper surfaces of the rib holes 30a and spaced from the top surface of the cushion member 30. In this way, the holding member 40 is in contact with the cushion member 30 only at the upper surfaces of the rib holes 30a.

The brake mechanism 50 is attached to the holding member 40 in a way that a cam 51 is inserted into a cam hole 41 of the holding member 40 through an inserting hole (not shown) of the brake mechanism 50, and that an anchor pin 52 is inserted into an anchor pin hole 42 of the holding member 40 trough an inserting hole (not shown) of the brake mechanism 50. The brake mechanism 50 is disposed on inner side of the inner peripheral portion of the rear wheel 520.

In this way, in this embodiment, the cushion member 30 and the brake mechanism 50 are disposed symmetrically about the holding member 40. In other words, the holding member 40 is interposed between the cushion member 30 and the brake mechanism 50.

Note that the cushion member 30 is heated by heat generated at the stator core 70. Meanwhile, the brake mechanism 50 is heated in a way that a brake shoe 53 is brought into contact with the inner peripheral portion of the rear wheel 520. As shown in FIG. 20, the electric motor 100 has a gear unit 90 and a gear shaft 112 which are inside the resin 20.

The gear unit 90 is disposed between the rotor 80 and the cushion member 30. The gear unit 90 is coupled to the rotor 80 through the gear shaft 112. The gear unit 90 is also coupled to one end portion of the axle 111.

The gear shaft 112 is coupled to the rotor 80 and the cushion member 30. One end portion of the gear shaft 112 is a free end disposed inside the one end portion of the axle 111. The other end portion of the gear shaft 112 is rotatably supported by a supporting mechanism 10c provided in the casing member 10.

The one end portion of the axle 111 is coupled to the gear unit 90. The other end potion of the axle 111 is coupled to the rear wheel 520. The axle 111 is rotatably supported by a supporting mechanism 30c, such as bearing, provided inside the cushion member 30. The supporting mechanism 30c has a larger structure than the supporting mechanism 10c which is similar to the supporting mechanism 30c.

Here, in a case where the electric motor 100 is provided to an electric vehicle, approximately a half of the weight of the electric vehicle, which is transmitted from the rear wheel 520 through the axle 111, is received by the cushion member 30. The cushion member 30 also receives the rotation stress of the rotor 80, the rotation stress caused by the brake mechanism 50 at the time of breaking, and the like. Accordingly, the cushion member 30 has not only a role as a casing member of the electric motor 100, but also a principal role in keeping mechanical strength, when the electric motor 100 includes the brake mechanism 50.

The resin 20 which seals the stator core 70 is disposed on one side of the cushion member 30, and the brake mechanism 50 is disposed on the other side of cushion member 30, while the cushion member 30 is located at the center therebetween. Accordingly, the resin 20 and the brake mechanism 50 are disposed adjacent to each other. For this reason, in the electric motor 100 including such a brake mechanism 50, it is desirable that heat transfer between the brake mechanism 50 and the casing member (including the casing member 10 and the cushion member 30) of the electric motor for housing the stator core 70 be prevented. Here, the brake mechanism 50 and the stator core 70 serve as heat sources.

In this embodiment, the casing member of the electric motor and the brake mechanism 50 are disposed symmetrically about the holding member 40. In other words, the casing member of the electric motor and the brake mechanism 50 are separately provided. Moreover, the holding member 40 is provided separately from the casing member of the electric motor and the brake mechanism 50.

In addition, the holding member 40 is mechanically coupled to each of the casing member of the electric motor and the brake mechanism 50. Accordingly, the holding member 40 is coupled thereto to such an extent that a sufficient mechanical bonding strength between the casing member of the electric motor and the brake mechanism 50 thereof can be obtained.

(Operations and Effects)

In the second embodiment, the electric motor 100 includes the holding member 40 which is interposed between the cushion member 30 and the brake mechanism 50, and which holds each of the cushion member 30 and the brake mechanism 50. In this way, the cushion member 30 and the holding member 40 are provided separately from each other. Accordingly, it is possible to prevent heat in the brake mechanism 50 from being directly transferred to the cushion member 30. As a result, the heat dissipation performance of the stator core 70 can be further improved.

Moreover, in the second embodiment, it is possible to prevent heat in the cushion member 30 from being directly transferred to the brake mechanism 50. Thereby, function deterioration of the brake mechanism 50 due to overheat can be prevented.

The cushion member 30 and the holding member 40 are provided separately from each other. Thereby, the brake mechanism 50 can be separated from the cushion member 30 by separating the holding member 40 from the cushion member 30. Accordingly, even when the design of the size of the brake mechanism 50 is changed, the design change in the cushion member 30 is unnecessary. As a result, the electric motor 100 can be applied to vehicles with various kinds of brake mechanisms.

Moreover, in the second embodiment, the holding member 40 is in contact with the cushion member 30 only at the upper surfaces of the rib holes 30a. Accordingly, the contact area of the cushion member 30 with the holding member 40 can be reduced. Thereby, it is possible to prevent heat transfer from the cushion member 30 to the brake mechanism 50, and to prevent heat transfer from the brake mechanism 50 to the cushion member 30.

Moreover, in the second embodiment, the outer peripheral portion of the resin 20 is exposed from the cushion member 30. Accordingly, the heat dissipation performance of the stator core 70 can be further improved.

[Third Embodiment]

(Configuration of Electric Vehicle)

Figure 21:
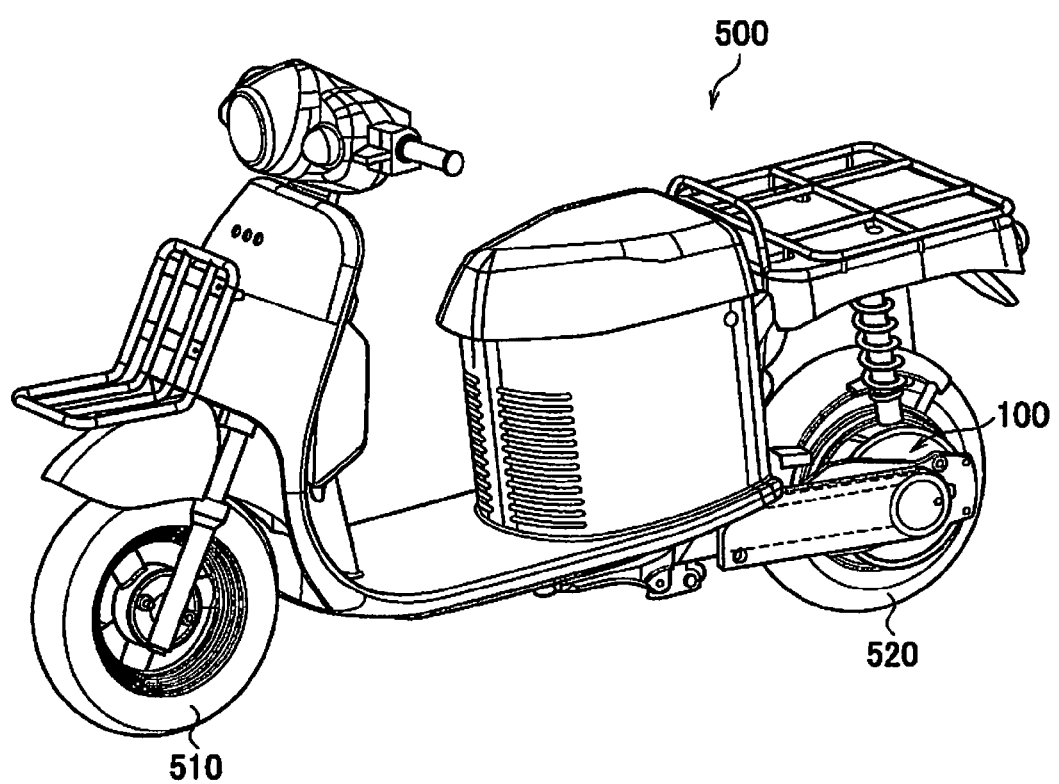
FIG. 21 is a view showing an example of an electric vehicle 500 according to a third embodiment.

Hereinafter, an electric vehicle according to the third embodiment will be described with reference to the drawing. FIG. 21 is a view showing one example of the electric vehicle 500 according to the third embodiment.

As shown in FIG. 21, the electric vehicle 500 is a motorcycle including a front wheel 510 and a rear wheel 520. Here, an electric motor 100 is provided to the rear wheel 520, and the rear wheel 520 is a driving wheel.

Note that the electric vehicle 500 provided with the electric motor 100 is not limited to a motorcycle. For example, the electric vehicle 500 may be a motor tricycle or a four wheeled automobile.

[Other Embodiment]

The present invention has been described with reference to the embodiments. However, the description and the drawings constituting parts of this disclosure are not construed to limit the invention. Various alternative embodiments, examples, and operation techniques will be obvious to those skilled in the art, on the basis of this disclosure.

In the embodiments described above, the casing member 10 is not provided outside the outer peripheral portion 73a of the stator core 70. However, embodiments are not limited thereto. Specifically, the casing member 10 may have a side surface covering portion formed so as to cover the outer peripheral portion 73a of the stator core 70.

In such a casing member, the opening 13a into which the resin 20 is filled may be provided not in the bottom surface covering portion formed so as to cover the bottom surface portion of the stator core 70, but in the side surface covering portion formed so as to cover the side surface portion of the stator core 70.

In each of the above described embodiments, the electric motor 100 includes the opening 13a and the opening 13b. However, it is only necessary that the electric motor 100 includes any one of the opening 13a and the opening 13b. When the electric motor 100 includes only one of the opening 13*a* and the opening 13*b*, the heat dissipation performance of the stator core 70 also can be improved.

In the above-described embodiments, the outside of the casing member 10 is not covered with the resin 20; however, embodiments are not limited thereto. Specifically, the outside of the casing member 10 may be covered with the resin 20.

What is claimed is:

1. An electric motor comprising:
   an annular stator core;
   a resin molding the stator core; and
   a casing member housing the stator core, wherein
   the casing member has an opening, a contact portion of an annular shape, and a crossing portion of a bridge shape lying between facing portions provided at the contact portion,
   the opening is a region surrounded by the contact portion and the crossing portion, and
   the resin is filled into the opening.

2. The electric motor according to claim 1, wherein
   the casing member has a protrusion protruding from a contact portion in contact with a bottom surface portion of the stator core, and
   an outer peripheral portion of the stator core has a groove which engages with the protrusion.

3. The electric motor according to claims 1, wherein
   the stator core has an annular stator yoke, and stator teeth which protrude inwardly in a radial direction from an inner peripheral portion of the stator yoke,
   parts of tip portions of the stator teeth and the resin form a cavity for housing a rotor, and
   the cavity has a cylindrical shape having a circular cross-section, a center of the circular cross-section is identical with the rotation center of the rotor.

4. An electric motor as recited in claim 1 comprising:
   a stator core;
   a resin molding the stator core;
   a casing member housing the stator core;
   a brake mechanism; and
   a holding member, holding both the casing member and the brake mechanism, interposed between the casing member and the brake mechanism.

5. An electric vehicle comprising the electric motor according to claim 1.

6. An electric motor comprising:
   a stator core;
   a resin molding the stator core; and
   a casing member housing the stator core, wherein
   the casing member has an opening, a contact portion of an annular shape, and a crossing portion of a bridge shape lying between facing portions provided at the contact portion,
   the opening is a region surrounded by the contact portion and the crossing portion, and
   the resin is exposed from the casing member at the opening.

7. An electric motor as recited in claim 6 comprising:
   a stator core;
   a resin molding the stator core;
   a casing member housing the stator core;
   a brake mechanism; and
   a holding member, holding both the casing member and the brake mechanism, interposed between the casing member and the brake mechanism.

* * * * *